(12) United States Patent
Venugopal et al.

(10) Patent No.: US 12,069,681 B2
(45) Date of Patent: Aug. 20, 2024

(54) TECHNIQUES FOR UNIFIED PHYSICAL DOWNLINK CONTROL CHANNEL CONFIGURATIONS

(71) Applicant: QUALCOMM Incorporated, San Diego, CA (US)

(72) Inventors: Kiran Venugopal, Raritan, NJ (US); Wooseok Nam, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 17/445,412

(22) Filed: Aug. 19, 2021

(65) Prior Publication Data
US 2023/0058592 A1 Feb. 23, 2023

(51) Int. Cl.
*H04W 72/23* (2023.01)
*H04L 1/08* (2006.01)
*H04L 5/00* (2006.01)

(52) U.S. Cl.
CPC .............. *H04W 72/23* (2023.01); *H04L 1/08* (2013.01); *H04L 5/0053* (2013.01)

(58) Field of Classification Search
CPC ......... H04W 72/23; H04L 1/08; H04L 5/0053
See application file for complete search history.

(56) References Cited

U.S. PATENT DOCUMENTS

| | | | |
|---|---|---|---|
| 11,647,525 B2* | 5/2023 | Kim .......................... | H04L 1/08 |
| | | | 370/329 |
| 2018/0337755 A1* | 11/2018 | John Wilson ..... | H04W 56/0015 |
| 2022/0078728 A1* | 3/2022 | Yi .......................... | H04W 48/16 |
| 2022/0240160 A1* | 7/2022 | Jang ...................... | H04L 1/0046 |
| 2022/0295320 A1* | 9/2022 | Lin ........................ | H04L 1/1812 |
| 2022/0385425 A1* | 12/2022 | Jang ...................... | H04L 5/0051 |
| 2023/0007504 A1* | 1/2023 | Jang ...................... | H04B 7/0695 |
| 2023/0016937 A1* | 1/2023 | Jang ...................... | H04W 72/23 |
| 2023/0096196 A1* | 3/2023 | Kim ...................... | H04L 5/0053 |
| | | | 370/329 |

(Continued)

OTHER PUBLICATIONS

International Search Report and Written Opinion—PCT/US2022/074068—ISA/EPO—Dec. 1, 2022.

(Continued)

*Primary Examiner* — Will W Lin
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive, from a base station, configuration information for a physical downlink control channel (PDCCH) associated with single frequency network (SFN) transmissions and PDCCH repetitions, wherein the configuration information indicates a first control resource set (CORESET) and a second CORESET, wherein the first CORESET is associated with a first transmission configuration indicator (TCI) state and the second CORESET is associated with a second TCI state. The UE may receive, from the base station and based at least in part on the reception of the configuration information, at least one of one or more SFN PDCCH messages or one or more PDCCH repetitions. Numerous other aspects are described.

28 Claims, 11 Drawing Sheets

(56) References Cited

U.S. PATENT DOCUMENTS

| | | | |
|---|---|---|---|
| 2023/0112271 A1* | 4/2023 | Kim | H04L 5/0053 370/329 |
| 2023/0413081 A1* | 12/2023 | Zhang | H04L 5/0094 |
| 2024/0008024 A1* | 1/2024 | Jung | H04W 72/11 |

OTHER PUBLICATIONS

Lenovo, et al., "Enhancements on Multi-TRP for PDCCH, PUCCH and PUSCH", 3GPP TSG RAN WG1 #103-e, R1-2008911, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020, XP051946723, 15 Pages, pp. 2-7.

* cited by examiner

TECHNIQUES FOR UNIFIED PHYSICAL DOWNLINK CONTROL CHANNEL CONFIGURATIONS

FIELD OF THE DISCLOSURE

Aspects of the present disclosure generally relate to wireless communication and to techniques and apparatuses for unified physical downlink control channel (PDCCH) configurations.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a base station, configuration information for a physical downlink control channel (PDCCH) associated with single frequency network (SFN) transmissions and PDCCH repetitions, wherein the configuration information indicates a first control resource set (CORESET) and a second CORESET, wherein the first CORESET is associated with a first transmission configuration indicator (TCI) state and the second CORESET is associated with a second TCI state. The method may include receiving, from the base station and based at least in part on the reception of the configuration information, at least one of one or more SFN PDCCH messages or one or more PDCCH repetitions.

Some aspects described herein relate to a method of wireless communication performed by a base station. The method may include transmitting, to a UE, configuration information for a PDCCH associated with SFN transmissions and PDCCH repetitions, wherein the configuration information indicates a first CORESET and a second CORESET, wherein the first CORESET is associated with a first TCI state and the second CORESET is associated with a second TCI state. The method may include transmitting, to the UE and based at least in part on the transmission of the configuration information, at least one of one or more SFN PDCCH messages or one or more PDCCH repetitions.

Some aspects described herein relate to a UE for wireless communication. The user equipment may include a memory and one or more processors coupled to the memory. The one or more processors may be configured to receive, from a base station, configuration information for a PDCCH associated with SFN transmissions and PDCCH repetitions, wherein the configuration information indicates a first CORESET and a second CORESET, wherein the first CORESET is associated with a first TCI state and the second CORESET is associated with a second TCI state. The one or more processors may be configured to receive, from the base station and based at least in part on the reception of the configuration information, at least one of one or more SFN PDCCH messages or one or more PDCCH repetitions.

Some aspects described herein relate to a base station for wireless communication. The base station may include a memory and one or more processors coupled to the memory. The one or more processors may be configured to transmit, to a UE, configuration information for a PDCCH associated with SFN transmissions and PDCCH repetitions, wherein the configuration information indicates a first CORESET and a second CORESET, wherein the first CORESET is associated with a first TCI state and the second CORESET is associated with a second TCI state. The one or more processors may be configured to transmit, to the UE and based at least in part on the transmission of the configuration information, at least one of one or more SFN PDCCH messages or one or more PDCCH repetitions.

Some aspects described herein relate to a non-transitory computer-readable medium that stores a set of instructions for wireless communication by a UE. The set of instructions, when executed by one or more processors of the UE, may cause the UE to receive, from a base station, configuration information for a PDCCH associated with SFN transmissions and PDCCH repetitions, wherein the configuration information indicates a first CORESET and a second CORESET, wherein the first CORESET is associated with a first TCI state and the second CORESET is associated with a second TCI state. The set of instructions, when executed by one or more processors of the UE, may cause the UE to receive, from the base station and based at least in part on the reception of the configuration information, at least one of one or more SFN PDCCH messages or one or more PDCCH repetitions.

Some aspects described herein relate to a non-transitory computer-readable medium that stores a set of instructions for wireless communication by a base station. The set of instructions, when executed by one or more processors of the base station, may cause the base station to transmit, to a UE, configuration information for a PDCCH associated with SFN transmissions and PDCCH repetitions, wherein the configuration information indicates a first CORESET and a second CORESET, wherein the first CORESET is associated with a first TCI state and the second CORESET is associated with a second TCI state. The set of instructions, when executed by one or more processors of the base station, may cause the base station to transmit, to the UE and based at least in part on the transmission of the configuration information, at least one of one or more SFN PDCCH messages or one or more PDCCH repetitions.

Some aspects described herein relate to an apparatus for wireless communication. The apparatus may include means for receiving, from a base station, configuration information for a PDCCH associated with SFN transmissions and PDCCH repetitions, wherein the configuration information indicates a first CORESET and a second CORESET, wherein the first CORESET is associated with a first TCI state and the second CORESET is associated with a second TCI state. The apparatus may include means for receiving, from the base station and based at least in part on the reception of the configuration information, at least one of one or more SFN PDCCH messages or one or more PDCCH repetitions.

Some aspects described herein relate to an apparatus for wireless communication. The apparatus may include means for transmitting, to a UE, configuration information for a PDCCH associated with SFN transmissions and PDCCH repetitions, wherein the configuration information indicates a first CORESET and a second CORESET, wherein the first CORESET is associated with a first TCI state and the second CORESET is associated with a second TCI state. The apparatus may include means for transmitting, to the UE and based at least in part on the transmission of the configuration information, at least one of one or more SFN PDCCH messages or one or more PDCCH repetitions.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
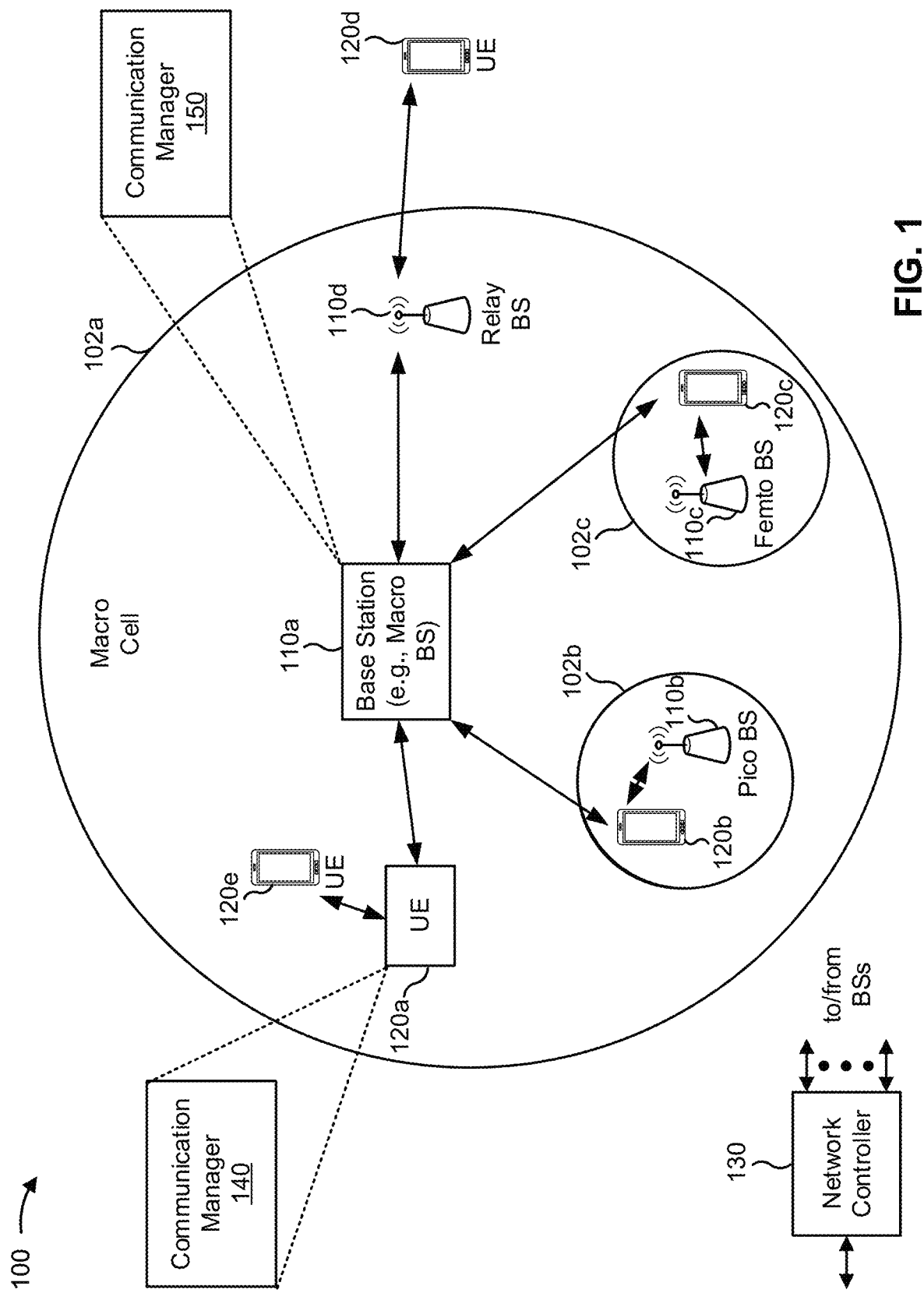
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, configuration information for a physical downlink control channel (PDCCH) associated with single frequency network (SFN) transmissions and PDCCH repetitions, wherein the configuration information indicates a first control resource set (CORESET) and a second CORESET, wherein the first CORESET is associated with a first transmission configuration indicator (TCI) state and the second CORESET is associated with a second TCI state; and receive, from the base station and based at least in part on the reception of the configuration information, at least one of one or more SFN PDCCH messages or one or more PDCCH repetitions. Additionally, or alternatively, the communication manager 140 may perform one or more other operations described herein.

In some aspects, the base station 110 may include a communication manager 150. As described in more detail elsewhere herein, the communication manager 150 may transmit, to UE 120, configuration information for a PDCCH associated with SFN transmissions and PDCCH repetitions, wherein the configuration information indicates a first CORESET and a second CORESET, wherein the first CORESET is associated with a first TCI state and the second CORESET is associated with a second TCI state; and transmit, to the UE and based at least in part on the transmission of the configuration information, at least one of one or more SFN PDCCH messages or one or more PDCCH repetitions. Additionally, or alternatively, the communication manager 150 may perform one or more other operations described herein.

As indicated above, FIG. 1 is provided as an example. Other examples may differ from what is described with regard to FIG. 1.

Figure 2:
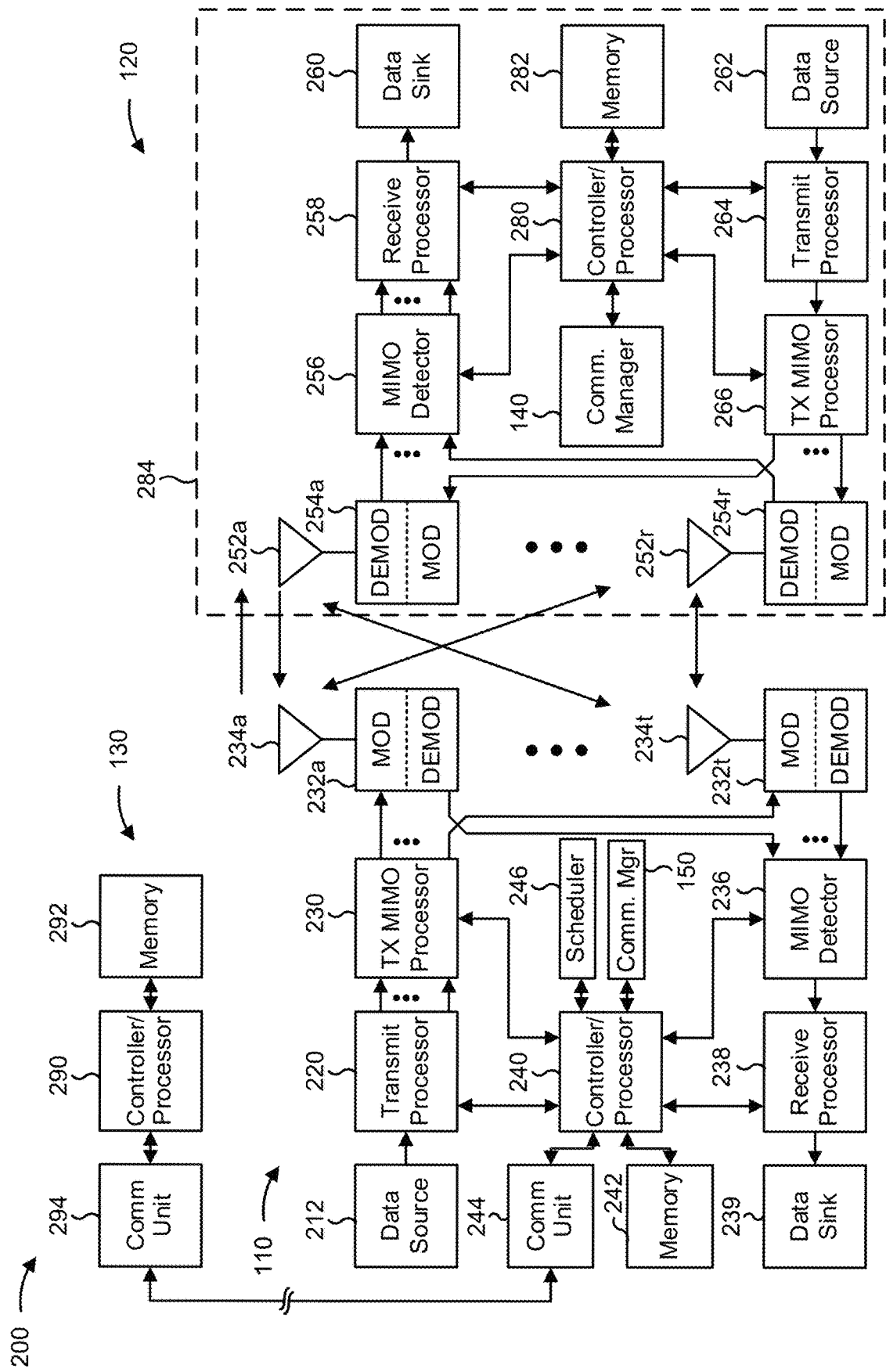
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the base station 110, the controller/processor 280 of the UE 120, and/or any other component(s) of FIG. 2 may perform one or more techniques associated with unified PDCCH configurations, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving, from a base station, configuration information for a PDCCH associated with SFN transmissions and PDCCH repetitions, wherein the configuration information indicates a first CORESET and a second CORESET, wherein the first CORESET is associated with a first TCI state and the second CORESET is associated with a second TCI state; and/or means for receiving, from the base station and based at least in part on the reception of the configuration information, at least one of one or more SFN PDCCH messages or one or more PDCCH repetitions. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, configuration information for a PDCCH associated with SFN transmissions and PDCCH repetitions, wherein the configuration information indicates a first CORESET and a second CORESET, wherein the first CORESET is associated with a first TCI state and the second CORESET is associated with a second TCI state; and/or means for transmitting, to the UE and based at least in part on the transmission of the configuration information, at least one of one or more SFN PDCCH messages or one or more PDCCH repetitions. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
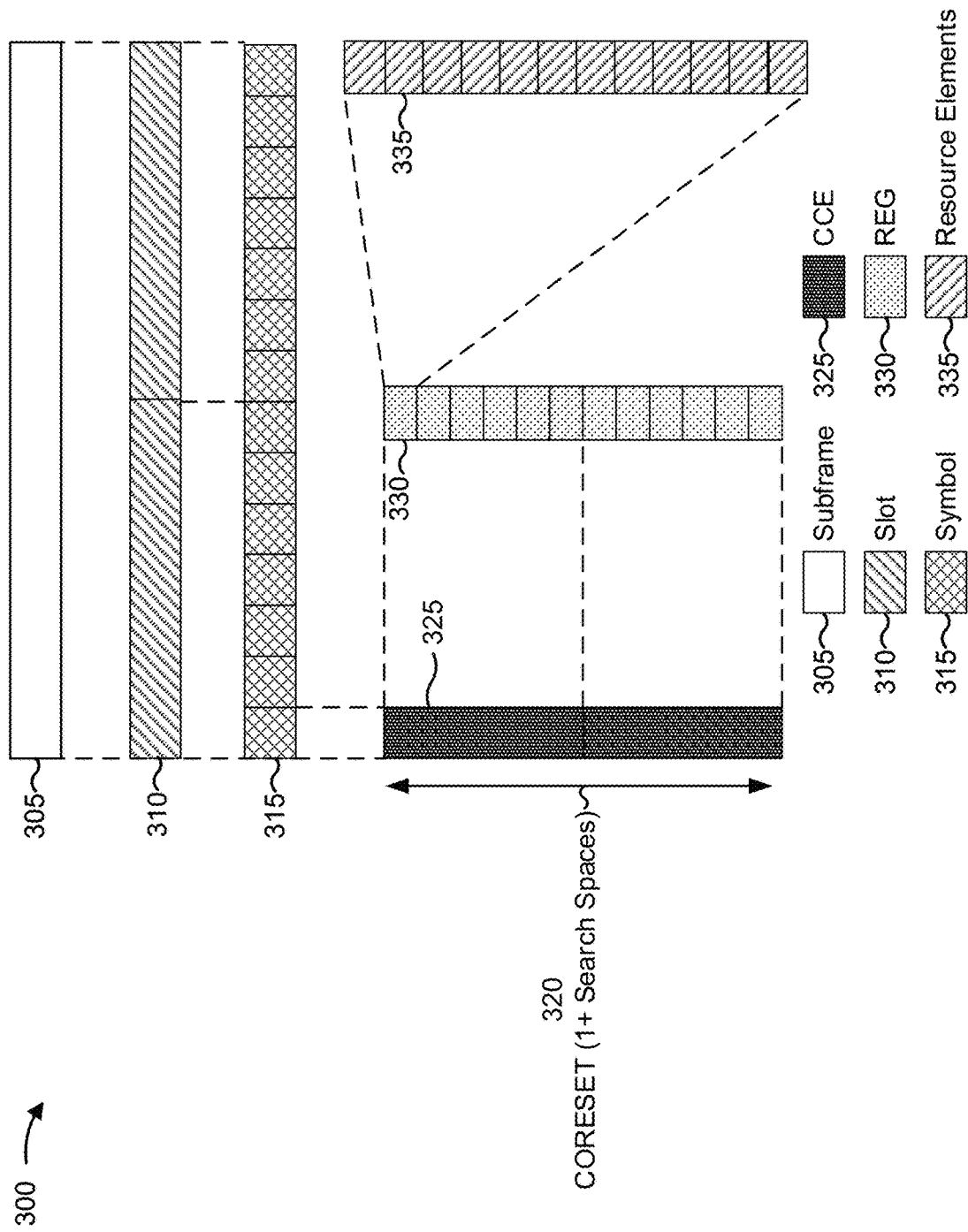
FIG. 3 is a diagram illustrating an example resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, or another quantity of slots). In some aspects, different types of transmission time intervals (TTIs) may be used, other than subframes and/or slots. A slot 310 may include multiple symbols 315, such as 14 symbols per slot.

The potential control region of a slot 310 may be referred to as a CORESET 320 and may be structured to support an efficient use of resources, such as by flexible configuration or reconfiguration of resources of the CORESET 320 for one or more PDCCHs and/or one or more physical downlink shared channels (PDSCHs). In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 2, 4, 8, 16, or another aggregation level.

Each CCE 325 may include a fixed quantity of resource element groups (REGs) 330, shown as 6 REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space (SS) set.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

Increases in carrier frequencies may enable the use of larger antenna arrays and bandwidths by UEs. Additionally, interest in millimeter wave frequency regimes is increasing, as these bandwidths can accommodate larger channel bandwidths than non-millimeter wave bandwidths. Bandwidth parts (BWPs), which are subsets of contiguous common physical resource blocks, may be used to configure active frequencies based on a UE's needs and capabilities. As used herein, "bandwidth part" or "BWP" may refer to a contiguous set of physical resource blocks (PRBs), where each PRB includes a set of frequencies corresponding to one or more subcarriers. As used herein, "subcarrier" may refer to a frequency based at least in part on a "carrier" frequency, and subcarriers may be aggregated to convey information wirelessly (for example, using OFDM symbols or other radio frequency symbols). Within a component carrier (CC), different BWPs may be supported on a band. In a typical case, a UE is expected to receive and transmit only within the frequency range configured for an active BWP (for example, rather than the entire frequency range of the band). CORESETs 320 or SS sets may be configured for a BWP. For example, a CORESET 320 may be configured for one or more BWPs configured for a UE. The UE may monitor PDCCH candidates in one or more CORESETs 320 on an active downlink BWP.

A base station may indicate a transmission configuration indicator (TCI) state associated with a CORESET. In some examples, the base station may indicate that TCI state using medium access control (MAC) control element (MAC-CE) signaling (e.g., PDCCH MAC-CE signaling). For example, a downlink beam, such as a base station transmit beam or a UE receive beam, may be associated with a TCI state. A TCI state may indicate a directionality or a characteristic of the downlink beam, such as one or more quasi co-location (QCL) properties of the downlink beam. A QCL property may include, for example, a Doppler shift, a Doppler spread, an average delay, a delay spread, and/or spatial receive parameters, among other examples. For example, the QCL information may be used by a UE to decode a reference signal (e.g., a demodulation reference signal (DMRS) or another reference signal) associated with the CORESET. In some cases, a source reference signal may be associated with a CORESET. For example, a synchronization signal block (SSB), a channel state information (CSI) reference signal (CSI-RS), or another reference signal may serve as a source reference signal that provides beam information for the CORESET, such as the QCL assumption information, among other examples, to be used by the UE to decode the CORESET (e.g., to decode a DMRS included in the CORESET). The source reference signal may be multiplexed (for example, time division multiplexed or frequency division multiplexed) with the CORESET.

As indicated above, FIG. 3 is provided as an example. Other examples may differ from what is described with respect to FIG. 3.

Figure 4:
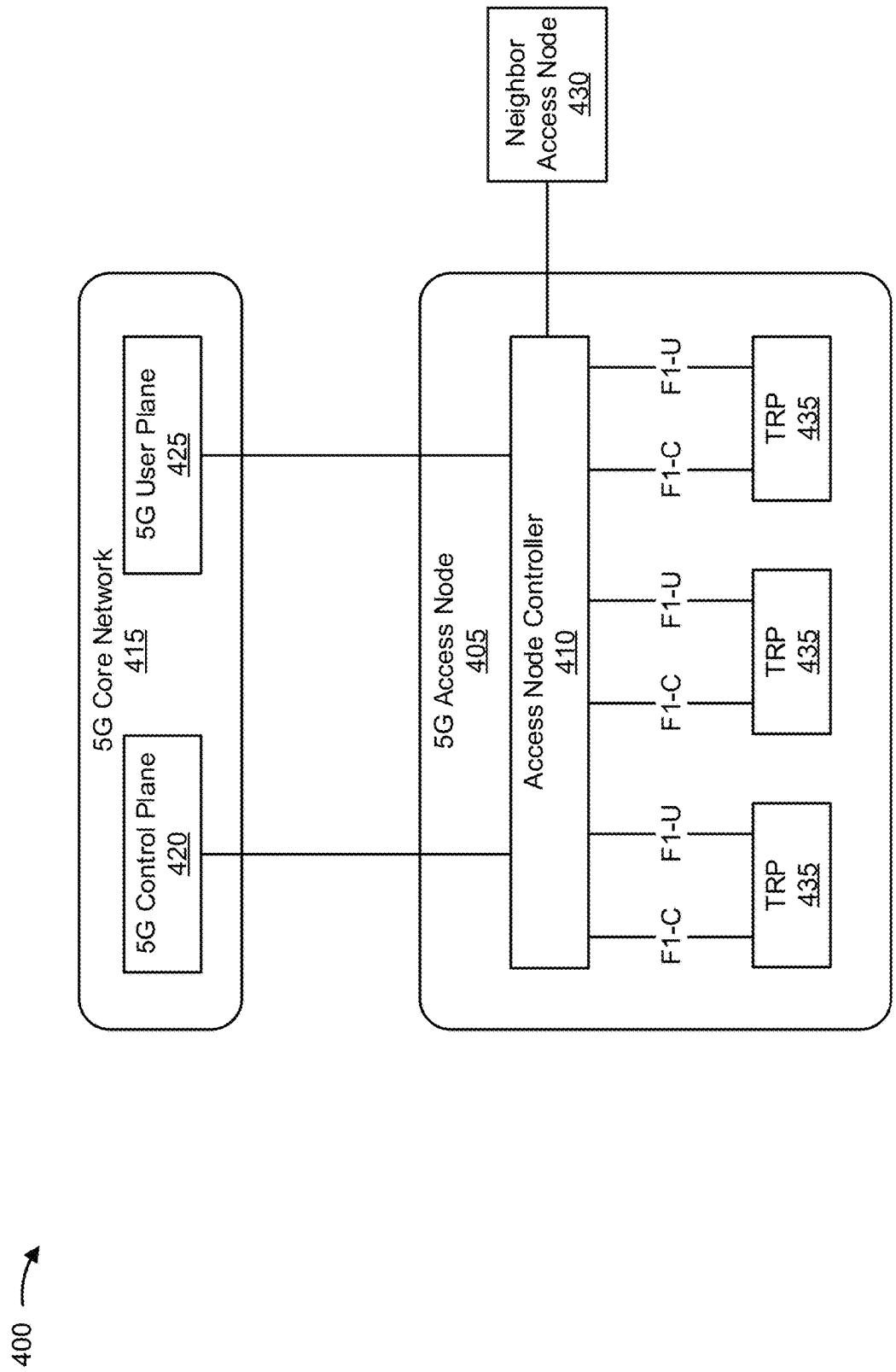
FIG. 4 illustrates an example logical architecture of a distributed radio access network (RAN), in accordance with the present disclosure.

FIG. 4 illustrates an example logical architecture of a distributed radio access network (RAN) 400, in accordance with the present disclosure.

A 5G access node 405 may include an access node controller 410. The access node controller 410 may be a central unit (CU) of the distributed RAN 400. In some aspects, a backhaul interface to a 5G core network 415 may terminate at the access node controller 410. The 5G core network 415 may include a 5G control plane component 420 and a 5G user plane component 425 (e.g., a 5G gateway), and the backhaul interface for one or both of the 5G control plane and the 5G user plane may terminate at the access node controller 410. Additionally, or alternatively, a backhaul interface to one or more neighbor access nodes 430 (e.g., another 5G access node 405 and/or an LTE access node) may terminate at the access node controller 410.

The access node controller 410 may include and/or may communicate with one or more TRPs 435 (e.g., via an F1 Control (F1-C) interface and/or an F1 User (F1-U) interface). A TRP 435 may be a distributed unit (DU) of the distributed RAN 400. In some aspects, a TRP 435 may correspond to a base station 110 described above in connection with FIG. 1. For example, different TRPs 435 may be included in different base stations 110. Additionally, or alternatively, multiple TRPs 435 may be included in a single base station 110. In some aspects, a base station 110 may include a CU (e.g., access node controller 410) and/or one or more DUs (e.g., one or more TRPs 435). In some cases, a TRP 435 may be referred to as a cell, a panel, an antenna array, or an array.

In some aspects, multiple TRPs 435 may transmit communications (e.g., the same communication or different communications) in the same transmission time interval (TTI) (e.g., a slot, a mini-slot, a subframe, or a symbol) or different TTIs using different QCL relationships (e.g., different spatial parameters, different transmission configuration indicator (TCI) states, different precoding parameters, and/or different beamforming parameters). In some aspects, a TCI state may be used to indicate one or more QCL relationships. A TRP 435 may be configured to individually (e.g., using dynamic selection) or jointly (e.g., using joint transmission with one or more other TRPs 435) serve traffic to a UE 120.

As indicated above, FIG. 4 is provided as an example. Other examples may differ from what was described with regard to FIG. 4.

Figure 5:
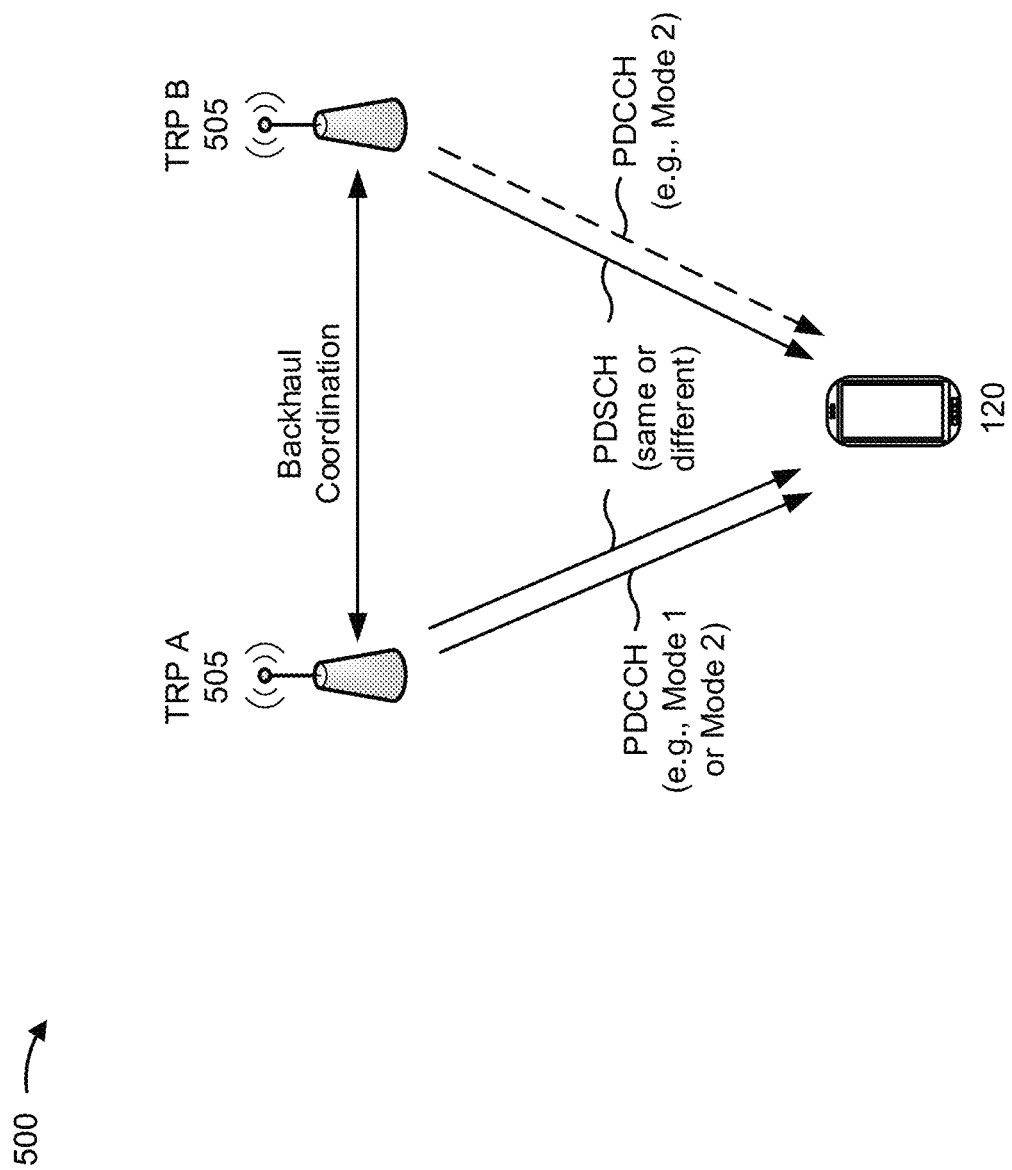
FIG. 5 is a diagram illustrating an example of multiple transmission receive point (multi-TRP) communication, in accordance with the present disclosure.

FIG. 5 is a diagram illustrating an example 500 of multi-TRP communication, in accordance with the present disclosure. Multi-TRP communication may sometimes be referred to as multi-panel communication. As shown in FIG. 5, multiple TRPs 505 may communicate with the same UE 120. A TRP 505 may correspond to a TRP 435 described above in connection with FIG. 4.

The multiple TRPs 505 (shown as TRP A and TRP B) may communicate with the same UE 120 in a coordinated manner (e.g., using coordinated multipoint transmissions) to improve reliability and/or increase throughput. The TRPs 505 may coordinate such communications via an interface between the TRPs 505 (e.g., a backhaul interface and/or an access node controller 410). The interface may have a smaller delay and/or higher capacity when the TRPs 505 are co-located at the same base station 110 (e.g., when the TRPs 505 are different antenna arrays or panels of the same base station 110), and may have a larger delay and/or lower capacity (as compared to co-location) when the TRPs 505 are located at different base stations 110. The different TRPs 505 may communicate with the UE 120 using different QCL relationships (e.g., different TCI states), different demodulation reference signal (DMRS) ports, and/or different layers (e.g., of a multi-layer communication).

In a first multi-TRP transmission mode (e.g., Mode 1), a single PDCCH may be used to schedule downlink data communications for a single physical downlink shared channel (PDSCH). In this case, multiple TRPs 505 (e.g., TRP A and TRP B) may transmit communications to the UE 120 on the same PDSCH. For example, a communication may be transmitted using a single codeword with different spatial layers for different TRPs 505 (e.g., where one codeword maps to a first set of layers transmitted by a first TRP 505 and maps to a second set of layers transmitted by a second TRP 505). As another example, a communication may be transmitted using multiple codewords, where different codewords are transmitted by different TRPs 505 (e.g., using different sets of layers). In either case, different TRPs 505 may use different QCL relationships (e.g., different TCI states) for different DMRS ports corresponding to different layers. For example, a first TRP 505 may use a first QCL relationship or a first TCI state for a first set of DMRS ports corresponding to a first set of layers, and a second TRP 505 may use a second (different) QCL relationship or a second (different) TCI state for a second (different) set of DMRS ports corresponding to a second (different) set of layers. In some aspects, a TCI state in DCI (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 505, and a second PDCCH may schedule a second codeword to be transmitted by a second TRP 505. Furthermore, first DCI (e.g., transmitted by the first TRP 505) may schedule a first PDSCH communication associated with a first set of DMRS ports with a first QCL relationship (e.g., indicated by a first TCI state) for the first TRP 505, and second DCI (e.g., transmitted by the second TRP 505) may schedule a second PDSCH communication associated with a second set of DMRS ports with a second QCL relationship (e.g., indicated by a second TCI state) for the second TRP 505. In this case, DCI (e.g., having DCI format 1_0 or DCI format 1_1) may indicate a corresponding TCI state for a TRP 505 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 5 is provided as an example. Other examples may differ from what is described with respect to FIG. 5.

Figure 6:
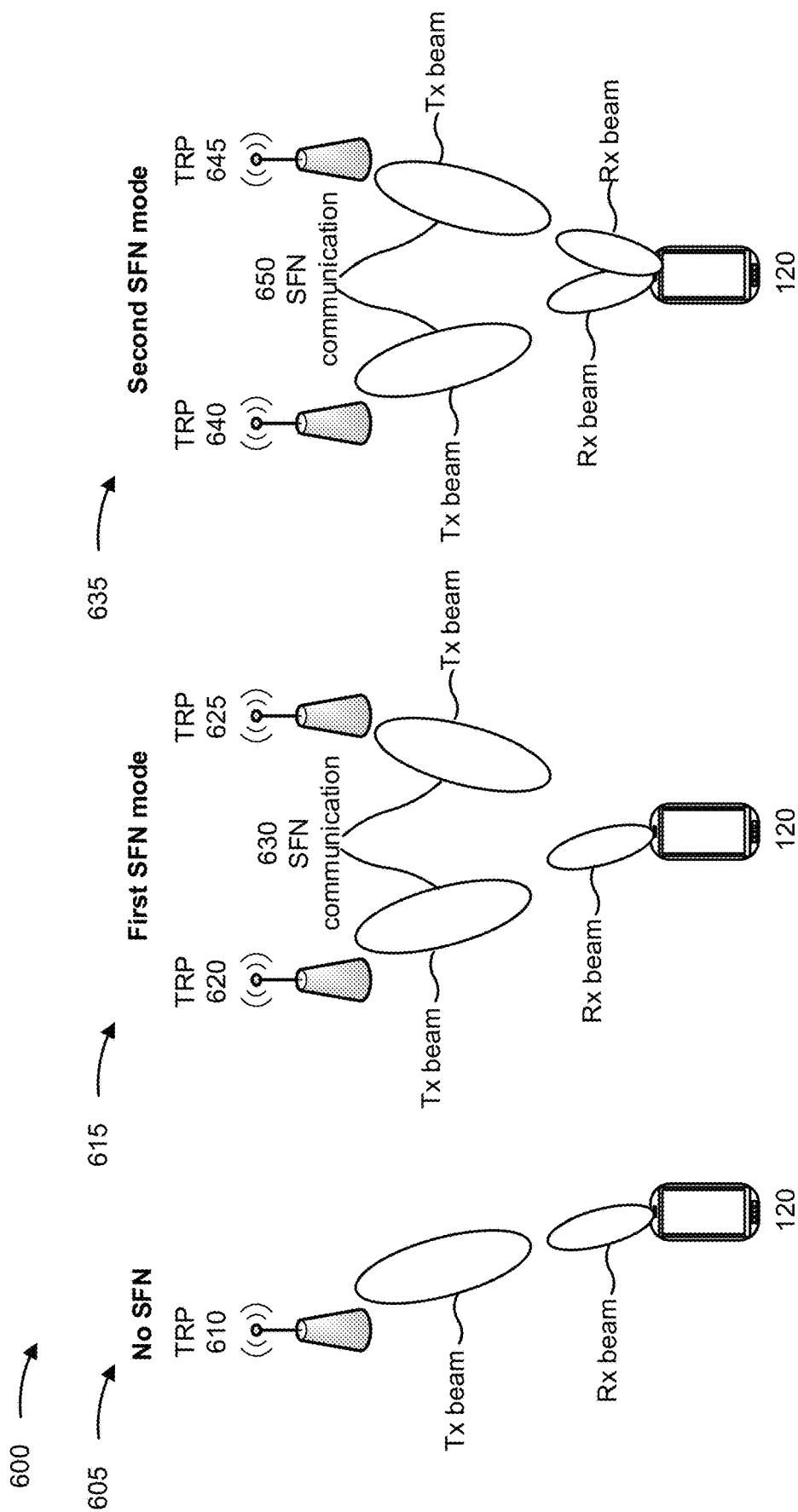
FIG. 6 is a diagram illustrating an example associated with single frequency network (SFN) communication, in accordance with the present disclosure.

FIG. 6 is a diagram illustrating an example 600 associated with SFN communication, in accordance with the present disclosure.

In some cases, a UE may operate in an SFN. An SFN may be a network configuration in which multiple cells (e.g., multiple base stations or multiple cells associated with a single base station) simultaneously transmit the same signal over the same frequency channel. For example, an SFN may be a broadcast network. An SFN may enable an extended coverage area without the use of additional frequencies. For example, an SFN configuration may include multiple base stations in an SFN area that transmit one or more identical signals using the same frequency at the same, or substantially the same, time. In some aspects, an SFN configuration may include other network devices, such as multiple TRPs corresponding to the same base station. The multiple TRPs may provide coverage for an SFN area. The multiple TRPs may transmit one or more identical signals using the same frequency at the same, or substantially the same, time. In some examples, the identical signal(s) simultaneously transmitted by the multiple base stations (and/or multiple TRPs) may include a PDSCH signal, a CORESET scheduling the PDSCH, and/or a reference signal (e.g., an SSB, a CSI-RS, a tracking reference signal (TRS), or other reference signals), among other examples.

As shown by reference number 605, an example of communications that do not use an SFN configuration is depicted. A TRP 610 may transmit communications using a transmit (Tx) beam to the UE 120. The transmit beam may be associated with a TCI state. The UE 120 may receive communications (e.g., transmitted by the TRP 610) using a receive (Rx) beam. For example, the UE 120 may identify the TCI state associated with the transmit beam and may use information provided by the TCI state to receive the communications.

As shown by reference number 615, an example of a first SFN mode is depicted. As shown in FIG. 6, a first TRP 620 (or a first base station 110) and a second TRP 625 (or a second base station 110) may transmit an SFN communication 630 to the UE 120. For example, the first TRP 620 and the second TRP 625 may transmit substantially the same information (e.g., the SFN communication 630) to the UE 120 using the same frequency domain resources and the same time domain resources. The first TRP 620 may transmit the SFN communication 630 using a first transmit beam. The second TRP 625 may transmit the SFN communication 630 using a second transmit beam. In the first SFN mode, the UE 120 may be unaware that the SFN communication 630 is transmitted on separate transmit beams (e.g., from different TRPs and/or different base stations 110). Accordingly, when the multiple base stations (and/or multiple TRPs) simultaneously transmit the same signal to a UE 120, the SFN configuration may be transparent to the UE 120, and the UE 120 may aggregate, or accumulate, the simultaneous signal transmissions from the multiple TRPs (and/or multiple base stations 110), which may provide higher signal quality or higher tolerance for multipath attenuation, among other benefits. For example, the UE 120 may receive the SFN communication 630 using a single receive beam (e.g., may use a single spatial receive direction, among other examples, to receive the SFN communication 630). In other words, TCI states of the different transmit beams used to transmit the SFN communication 630 may not be signaled to the UE 120.

As shown by reference number 635, an example of a second SFN mode is depicted. As shown in FIG. 6, a first TRP 640 (or a first base station 110) and a second TRP 645 (or a second base station 110) may transmit an SFN communication 650 to the UE 120. For example, the first TRP 640 and the second TRP 645 may transmit substantially the same information (e.g., the SFN communication 650) to the UE 120 using the same frequency domain resources and the same time domain resources. The first TRP 640 may transmit the SFN communication 650 using a first transmit beam. The second TRP 645 may transmit the SFN communication 650 using a second transmit beam. In the second SFN mode, the UE 120 may be aware that the SFN communication 650 is transmitted on separate transmit beams (e.g., from different TRPs and/or different base stations 110). For example, a first TCI state of the first transmit beam (e.g., associated with the first TRP 640) and a second TCI state of the second transmit beam (e.g., associated with the second TRP 645) may be signaled to the UE 120. For example, a base station 110 may transmit configuration information that indicates that the SFN communication 650 may be a combination of transmissions from different TRPs and/or different transmit beams. The UE 120 may use the information associated with the different TRPs and/or different transmit beams (e.g., the first TCI state and the second TCI state) to improve a reception performance of the SFN communication 650. For example, as shown in FIG. 6, the UE 120 may use different spatial directions (e.g., different receive beams) to receive the SFN communication 650 based at least in part on the TCI states of the transmit beam(s) associated with the SFN communication 650. This may improve a performance of the UE 120 because the UE 120 may receive the SFN communication 650 from different transmit beams and/or different TRPs with improved signal strength and/or signal quality, among other examples.

For example, SFN based PDCCH communications may be associated with two or more TCI states (e.g., each TCI state associated with a single TRP and/or single base station 110). "SFN based PDCCH" may refer to PDCCH communications or transmissions that are transmitted by a base station 110 in an SFN manner (e.g., as described in more detail herein). As used herein, "SFN transmissions" may refer to two or more transmissions that are transmitted using the same (or substantially the same) time domain resources and frequency domain resources, as described above. The UE 120 may receive multiple PDCCH configurations (e.g., configuring CORESETs, search space sets, and/or TCI states). A serving cell (e.g., a base station 110) may activate two or more TCI states (e.g., from previously configured PDCCH configurations) for SFN based PDCCH communications. For example, a base station 110 may transmit an indication to activate two or more TCI states for SFN based PDCCH communications. The base station 110 may transmit a MAC-CE to activate the two or more TCI states. The MAC-CE may indicate a serving cell identifier (e.g., associated with the SFN based PDCCH communications), a CORESET identifier, and/or two or more TCI state identifiers. For example, the two or more TCI states may be associated with a single CORESET (e.g., because the SFN based PDCCH communications may be transmitted using the same time domain and frequency domain resources). In this way, multiple TCI states may be associated with, or activated for, SFN based PDCCH communications.

As indicated above, FIG. 6 is provided as an example. Other examples may differ from what is described with respect to FIG. 6.

A base station may transmit a PDCCH to a UE. For example, the base station may transmit the PDCCH in a PDCCH candidate. The PDCCH candidate may be included in a search space, which may be included in a search space set. The UE may attempt to decode a PDCCH (referred to herein as monitoring a PDCCH) in one or more monitoring occasions of the search space set, as described above.

A base station may configure PDCCH repetition to improve reliability of PDCCH transmission. As used herein, "PDCCH repetition" may refer to a repetition of a PDCCH message, such as DCI. As used herein, "repetition" may refer to the initial communication and also to a repeated transmission of the initial communication. Thus, each transmission (regardless of whether the transmission is an initial transmission or a retransmission) is counted as a repetition. Each repetition of a PDCCH repetition may be in a PDCCH candidate. Two or more PDCCH candidates may be linked for potential repetition of the same DCI (e.g., for the same PDCCH message). For example, two PDCCH candidates in different SS sets (associated with corresponding CORESETs) may be linked together for PDCCH repetition (e.g., a search space set with index 2 may be linked with a search space set with index 4). If the two linked search space sets are associated with different CORESETs, given that a TCI state is configured and activated per CORESET, different PDCCH repetitions can use different TCI states, thus enabling beam diversity and multi-TRP diversity. Each search space set may have different monitoring occasions (MOs) within a slot and across slots. For PDCCH repetition, an MO of a first search space set may be linked with an MO of a second search space set. The mechanism for linking MOs of the two SS sets can be rule-based or configuration-based. Depending on the search space set configuration (with regard to an MO), PDCCH repetition can be in a time-division multiplexing manner (where PDCCH repetitions occupy different time resources), a frequency division multiplexing manner (where PDCCH repetitions occupy different frequency resources), or both.

A UE and a base station may communicate with each other using beamformed communications. For example, on the downlink, the base station may transmit a communication using a transmit beam and the UE may receive the communication using a receive beam. On the uplink, the UE may transmit a communication using a transmit beam and the base station may receive the communication using a receive beam. As mentioned above, a beam for a communication may be indicated based at least in part on a TCI state, which may indicate a QCL relationship and a source reference signal from which a QCL property is to be derived. One example of a QCL property is a spatial parameter (e.g., a spatial receive parameter or a spatial transmit parameter), which may be referred to as QCL Type D.

A base station may configure a UE with multiple PDCCH configurations for different operations. For example, a base station may configure different CORESETs and associated search spaces for unicast PDCCH operations, PDCCH repetition operations, and/or SFN PDCCH operations, among other examples. For example, a PDCCH configuration for PDCCH repetitions may configure two CORESETs. Each CORESET may be associated with a single TCI state. Additionally, the PDCCH configuration for PDCCH repetitions may configure two search space sets. Each search space set may be associated with one of the two CORESETs. The two search space sets may be associated with one or more of the same configuration parameters. For example, the two search space sets may be configured to have the same periodicity, same number of monitoring occasions for each slot, same aggregation level, and/or same number of PDCCH candidates, among other examples. As another example, the base station may configure a CORESET for SFN based PDCCH operations. The CORESET may be associated with two TCI states (e.g., each TCI state being associated with a different TRP), as described in more detail elsewhere herein.

As described herein, different PDCCH operations may require different PDCCH configurations and/or different CORESET configurations. For example, CORESETs may be configured differently for PDCCH repetitions and for SFN based PDCCH operations. Therefore, the base station may transmit multiple PDCCH configurations and/or multiple CORESET configurations to the UE to enable different PDCCH operations. This consumes significant signaling overhead associated with the base station transmitting the multiple PDCCH configurations and/or multiple CORESET configurations to the UE. Additionally, a cell (e.g., a base station) may be associated with a maximum number of CORESETs that can be configured on the cell. Therefore, configuring multiple CORESETs to support different PDCCH operations on the cell may result in reduced flexibility for the base station because of the number of CORESETs that need to be configured to support the different PDCCH operations. This problem is compounded as new PDCCH operations are added and/or supported by the cell.

Some techniques and apparatuses described herein enable unified PDCCH configurations. For example, some techniques and apparatuses described herein provide for a unified PDCCH configuration for PDCCH repetitions and SFN based PDCCH communications. For example, the unified PDCCH configuration may include two CORESET configurations. Each CORESET may be configured with different CORESET index values and different TCI states, with one or more (or all) of the remaining parameters being the same among the two CORESET configurations. In some aspects, each CORESET may be associated with one SS set. In some other aspects, a single SS set may be associated with both CORESETs.

Therefore, a base station may be enabled to flexibly switch between PDCCH repetitions and SFN based PDCCH communications using the same PDCCH configuration. For example, where each CORESET is associated with one SS set, semi-static, Layer 2, and/or dynamic signaling may be used to switch the PDCCH operation associated with the PDCCH configuration between PDCCH repetitions and SFN based PDCCH communications. In some aspects, a UE and/or base station may identify a PDCCH operation associated with the PDCCH configuration based at least in part on one or more parameters associated with the two SS sets. For example, if both SS sets have the same monitoring offset (e.g., if both SS sets share the same monitoring offset, share the same time domain resources, and/or share the same frequency domain resources), then the UE and/or base station may identify that the PDCCH configuration is associated with SFN based PDCCH operations. If the SS sets have different monitoring offsets, then the UE and/or base station may identify that the PDCCH configuration is associated with PDCCH repetitions. The base station may switch the PDCCH operation associated with the PDCCH configuration by modifying the one or more parameters associated with the SS sets.

In an example where the two CORESETs are associated with a single SS set, the base station may flexibly switch the PDCCH operation associated with the PDCCH configuration between PDCCH repetitions and SFN based PDCCH communications by activating or deactivating the second CORESET associated with the SS set (e.g., via MAC-CE signaling and/or dynamic signaling). For example, when the second CORESET is activated (e.g., when the SS set is associated with two activated CORESETs), the UE and/or base station may identify that the PDCCH configuration is associated with SFN based PDCCH operations. If the second CORESET is deactivated (e.g., when the SS set is associated with only one CORESET), then the UE and/or base station may identify that the PDCCH configuration is associated with PDCCH repetitions.

As a result, a unified and flexible PDCCH configuration is provided. For example, the base station may be enabled to switch PDCCH operations (e.g., between PDCCH repetitions and SFN based PDCCH communications) for the same PDCCH configuration without needing to reconfigure the PDCCH configuration. This provides added scheduling flexibility for the base station. Enabling the same PDCCH configuration to be used for multiple PDCCH operations (e.g., PDCCH repetitions and SFN based PDCCH communications) reduces latency associated with switching between the different PDCCH operations, because dynamic or semi-static switching can be used, rather than requiring a PDCCH reconfiguration (e.g., an RRC reconfiguration). Moreover, this reduces a signaling overhead associated with configuring and/or reconfiguring PDCCH configurations. Additionally, this reduces a total number of PDCCH configurations needed to enable PDCCH repetitions and SFN based PDCCH communications in the wireless network (e.g., reducing signaling overhead and providing additional flexibility to the base station to configure additional or different PDCCH configurations, CORESET configurations, and/or SS set configurations).

Figure 7:
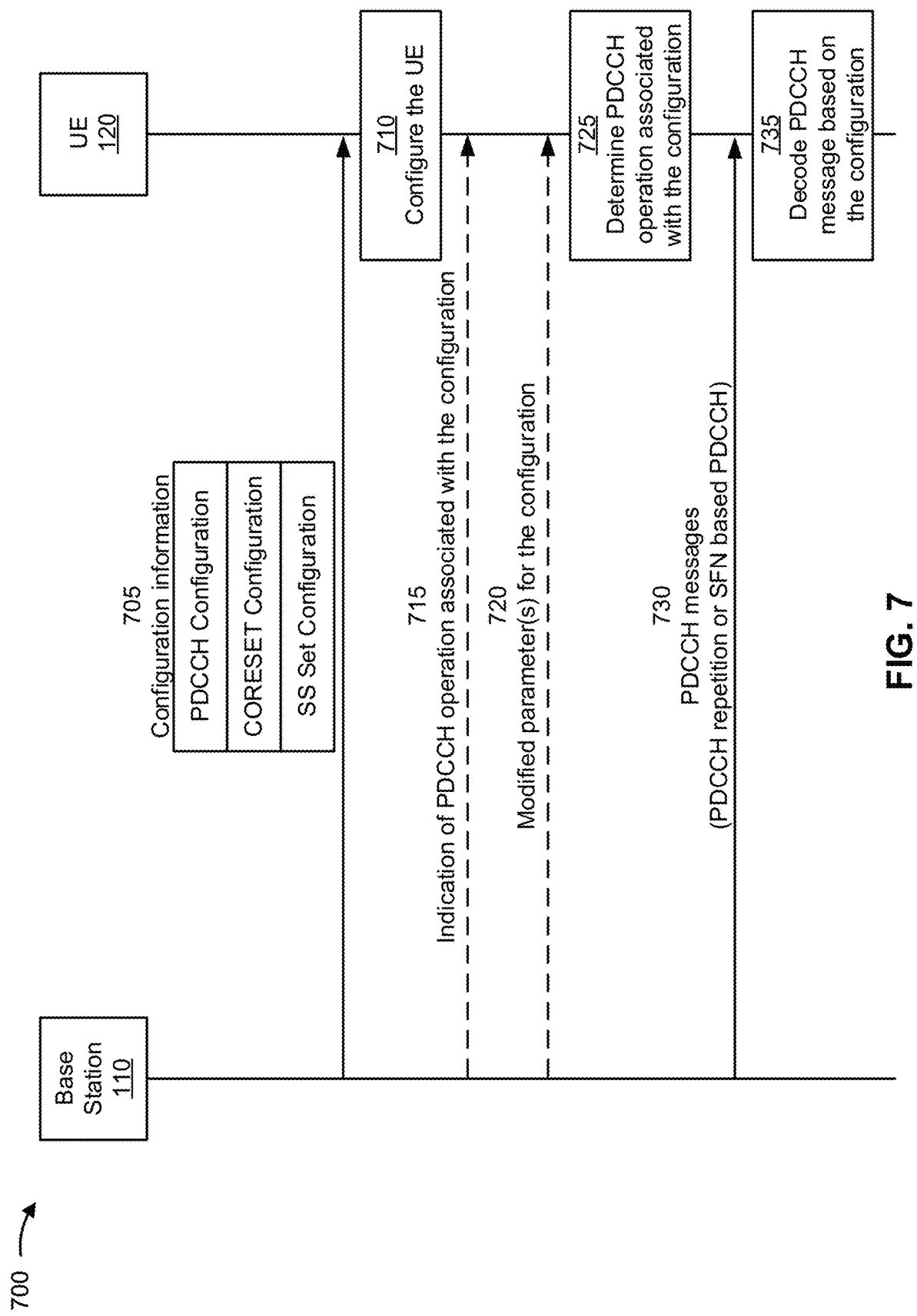
FIG. 7 is a diagram illustrating an example associated with unified physical downlink control channel (PDCCH) configurations, in accordance with the present disclosure.

FIG. 7 is a diagram illustrating an example 700 associated with unified PDCCH configurations, in accordance with the present disclosure. As shown in FIG. 7, a base station 110 and a UE 120 may communicate with one another in a wireless network, such as the wireless network 100.

As shown by reference number 705, the base station 110 may transmit, and the UE 120 may receive, configuration information. In some aspects, the UE 120 may receive configuration information from another device (e.g., from another base station or another UE). In some aspects, the UE 120 may receive the configuration information via RRC signaling and/or MAC signaling (e.g., MAC control elements (MAC-CEs)). In some aspects, the configuration information may include an indication of one or more configuration parameters (e.g., already known to the UE 120) for selection by the UE 120 and/or explicit configuration information for the UE 120 to use to configure the UE 120.

In some aspects, the configuration information may indicate a PDCCH configuration associated with SFN transmissions and/or PDCCH repetitions. In some aspects, the configuration information may indicate a first CORESET and a second CORESET, where the first CORESET is associated with a first TCI state and the second CORESET is associated with a second TCI state. In some aspects, the configuration information may indicate that the PDCCH configuration may be used for both SFN based PDCCH communications and for PDCCH repetitions.

In some aspects, the configuration information may indicate a PDCCH configuration, one or more CORESET configurations, and/or one or more SS set configurations, among other examples. For example, the base station 110 may transmit, and the UE 120 may receive, one or more search space configurations (e.g., that define how and/or where the UE 120 is to search or monitor for PDCCH candidates, as described in more detail in connection with FIG. 3). Each search space (or SS set) may be associated with one or more CORESETs (e.g., associated with time domain and/or frequency domain resources and one or more PDCCH candidates, as described in more detail in connection with FIG. 3). For example, a search space configuration may include an indication (e.g., by including a CORESET identifier or index value) of one or more CORESET configurations associated with the search space configuration.

In some aspects, the configuration information may indicate that the first CORESET is associated with a first set of configuration parameters and the second CORESET is associated with a second set of configuration parameters, where the first set of configuration parameters and the second set of configuration parameters indicate the same information for one or more parameters, and indicate different information for a first parameter associated with a CORESET index and a second parameter associated with an active TCI state. In other words, the first CORESET and the second CORESET may share a similar (or the same) configuration except for a CORESET index value and an active TCI state associated with each CORESET. This may enable each CORESET to be used for PDCCH repetitions and SFN based PDCCH communications because both PDCCH repetitions and SFN based transmissions are transmitted using CORESETs having similar (or the same) configurations, but using different beams or different TCI states. Therefore, PDCCH configurations for SFN based PDCCH communications and PDCCH configurations for PDCCH repetitions may be unified in that both PDCCH configurations include two CORESET configurations, with each CORESET configuration being associated with different beams or different TCI states.

In some aspects, the configuration information may include an indication of a first search space set associated with the first CORESET and a second search space set associated with the second CORESET. In some aspects, the first search space set and the second search space set may have the same configuration for one or more parameters. In some aspects, the first search space set and the second search space may be associated with different search space set index values. In other words, the first search space and the second search space may have a similar (or the same) configuration except for a space set index value. When the first search space and the second search space have a similar (or the same) configuration, the UE 120 and/or the base station 110 may identify that the PDCCH configuration is associated with SFN based PDCCH communications. For example, if the first search space and the second search space have a similar (or the same) configuration and if the first CORESET and the second CORESET have a similar (or the same) configuration, then the PDCCH configuration may indicate that PDCCH transmissions are to be transmitted using the same time domain resources and/or frequency domain resources, but with different beams or TCI states (e.g., in an SFN manner as described in more detail in connection with FIG. 6). Conversely, if the first search space and the second search space are associated with one or more parameters that are different (such as a monitoring offset value, a timing offset value, a frequency offset value, a time domain resource allocation, and/or a frequency domain resource allocation), then the UE 120 and/or the base station 110 may identify that the PDCCH configuration is associated with PDCCH repetitions.

As shown by reference number 710, the UE 120 may configure the UE 120 for communicating with the base station 110. In some aspects, the UE 120 may configure the UE 120 based at least in part on the configuration information. In some aspects, the UE 120 may be configured to perform one or more operations described herein.

In some aspects, the UE 120 may transmit, and the base station 110 may receive, an indication of a capability of the UE 120 to support a unified PDCCH configuration, as described herein. For example, the UE 120 may transmit capability information indicating whether the UE 120 is capable of supporting a PDCCH configuration associated with PDCCH repetitions and/or SFN based PDCCH communications, as described herein (e.g., whether the UE 120 is capable of supporting a PDCCH configuration associated with both PDCCH repetitions and/or SFN based PDCCH communications). In some aspects, the UE 120 may transmit the indication of the capability via RRC signaling, one or more MAC-CEs, and/or a physical uplink control channel (PUCCH) message, among other examples. In some aspects, the base station 110 may determine the configuration information based at least in part on the indication of the capability transmitted by the UE 120.

As shown by reference number 715, the base station 110 may transmit, and the UE 120 may receive, an indication of a PDCCH operation (e.g., SFN based PDCCH communications or PDCCH repetitions) associated with the configuration information (e.g., associated with the PDCCH configuration). In some aspects, the base station 110 may transmit the indication of the PDCCH operation associated with the configuration information (e.g., associated with the PDCCH configuration) via RRC signaling, MAC-CE signaling, DCI signaling, semi-static signaling, Layer 2 signaling, and/or dynamic signaling, among other examples.

For example, the base station 110 may transmit, and the UE 120 may receive, an indication that the configuration information (e.g., the PDCCH configuration) is activated for SFN transmissions (e.g., for SFN based PDCCH communications) or for PDCCH repetitions. The base station 110 may activate a PDCCH operation (e.g., SFN based PDCCH communications or PDCCH repetitions) for a period of time (e.g., using semi-static signaling or MAC-CE signaling). Additionally, or alternatively, the base station 110 may activate a PDCCH operation (e.g., SFN based PDCCH communications or PDCCH repetitions) for one or more PDCCH communications (e.g., using dynamic signaling, DCI signaling, and/or MAC-CE signaling).

In some aspects, one or more rules may indicate a PDCCH operation associated with the PDCCH configuration. For example, if a CORESET configuration or search space configuration is associated with the same time domain resource allocation, the same frequency domain resource allocation, and/or the same monitoring offset(s) (e.g., as indicated by the configuration information), then the UE 120 may determine that the PDCCH configuration is associated with SFN based PDCCH communications. If at least one of a time domain resource allocation, a frequency domain resource allocation, and/or a monitoring offset(s) is different for different CORESETs or search spaces, then the UE 120 may determine that the PDCCH configuration is associated with PDCCH repetitions.

In other words, the base station 110 may use a same configuration (e.g., same PDCCH configuration type or format) for SFN based PDCCH communications and for PDCCH repetitions, but one or more restraints or rules may be applied by the base station 110 to configure the PDCCH for SFN based PDCCH communications or for PDCCH repetitions. For example, if the base station 110 is to use the PDCCH configuration for SFN based PDCCH communications, the base station 110 may ensure that CORESET frequency locations for the two CORESETs associated with the PDCCH configuration are the same and/or that monitoring offsets (e.g., time domain monitoring offset and/or frequency domain monitoring offset) for the two search space sets associated with the PDCCH configuration are the same, among other examples (e.g., to enable SFN based PDCCH communications that are transmitted using the same time domain resources and the same frequency domain resources).

For example, as described above, the UE 120 may receive an indication of a first search space set associated with a first CORESET and a second search space set associated with a second CORESET (e.g., for the PDCCH configuration). The configuration information may indicate a first monitoring offset associated with the first search space set, a second monitoring offset associated with the second search space set, a first frequency domain resource allocation associated with the first CORESET, and a second frequency domain resource allocation associated with the second CORESET. The UE 120 may identify that the PDCCH configuration is associated with, or is activated for, SFN transmissions or for PDCCH repetitions based at least in part on the first monitoring offset associated with the first search space set, the second monitoring offset associated with the second search space set, the first frequency domain resource allocation associated with the first CORESET, and/or the second frequency domain resource allocation associated with the second CORESET. For example, if the first monitoring offset and the second monitoring offset are the same, then the UE 120 may identify that the PDCCH configuration is associated with, or is activated for, SFN based PDCCH communications. If the first monitoring offset and the second monitoring offset are different, then the UE 120 may identify that the PDCCH configuration is associated with, or is activated for, PDCCH repetitions. In other words, the configuration information (e.g., the PDCCH configuration) may be activated for SFN transmissions based at least in part on the first monitoring offset and the second monitoring offset being a same monitoring offset. The configuration information (e.g., the PDCCH configuration) may be activated for PDCCH repetitions based at least in part on the first monitoring offset and the second monitoring offset being different monitoring offsets.

As another example, if the first frequency domain resource allocation and the second frequency domain resource allocation are the same, then the UE 120 may identify that the PDCCH configuration is associated with, or is activated for, SFN based PDCCH communications. If the first frequency domain resource allocation and the second frequency domain resource allocation are different, then the UE 120 may identify that the PDCCH configuration is associated with, or is activated for, PDCCH repetitions. In this way, the values of configuration parameters indicated by the base station 110 may indicate the PDCCH operation associated with the PDCCH configuration. Therefore, the base station 110 may use the same PDCCH configuration type or format (e.g., for both SFN based PDCCH communications and PDCCH repetitions) and may indicate the PDCCH operation associated with the PDCCH configuration explicitly (e.g., using signaling) or implicitly (e.g., by the values of parameters indicated by the PDCCH configuration).

In some aspects, the base station 110 may transmit, and the UE 120 may receive, an indication of a search space set for the PDCCH configuration that is associated with both a first CORESET and a second CORESET (e.g., indicated via the configuration information). The base station 110 may transmit, and the UE 120 may receive, an indication to activate at least one of the first CORESET or the second CORESET (e.g., via MAC-CE signaling or another type of dynamic signaling). The reception of the indication to activate at least one of the first CORESET or the second CORESET may indicate (e.g., to the UE 120) that the configuration information (e.g., the PDCCH configuration) is activated for SFN transmissions or PDCCH repetitions. For example, if the indication to activate at least one of the first CORESET or the second CORESET indicates that both the first CORESET and the second CORESET are activated for the search space set, then the UE 120 may identify that the search space set (and/or the PDCCH configuration) is associated with, or activated for, SFN based PDCCH communications. If the indication to activate at least one of the first CORESET or the second CORESET indicates that only one of the first CORESET or the second CORESET is activated for the search space set, then the UE 120 may identify that the search space set (and/or the PDCCH configuration) is associated with, or activated for, PDCCH repetitions. In other words, when one CORESET is activated for the search space set, the search space set may be used for PDCCH repetitions (e.g., by the base station 110 and/or the UE 120). When both CORESETs (e.g., having different TCI states, but otherwise similar (or the same) configurations, as described above) are activated for the search space set, the search space set may be used for SFN based PDCCH repetitions (e.g., by the base station 110 and/or the UE 120).

In some aspects, as shown by reference number 720, the base station 110 may transmit, and the UE 120 may receive, an indication of one or more modified parameters associated with the configuration information (e.g., associated with the PDCCH configuration). The base station 110 may transmit the indication of the one or more modified parameters associated with the configuration information via RRC signaling, MAC-CE signaling, DCI signaling, semi-static signaling, and/or Layer 2 signaling, among other examples. For example, the base station 110 may transmit, and the UE 120 may receive, an indication of modified values for a first monitoring offset associated with the first search space set, a second monitoring offset associated with the second search space set, a first frequency domain resource allocation associated with the first CORESET, and/or a second frequency domain resource allocation associated with the second CORESET, among other examples. The indication transmitted by the base station 110 may include modified values or information associated with the first monitoring offset, the second monitoring offset, the first frequency domain resource allocation, and/or the second frequency domain resource allocation. The transmission or the reception of the indication of the modified parameter(s) may indicate that the configuration information is activated for SFN transmissions or for PDCCH repetitions. For example, as described above, if the modified parameter(s) indicate that the first monitoring offset and the second monitoring offset are the same and/or that the first frequency domain resource allocation and the second frequency domain resource allocation are the same, then the reception of the modified parameter(s) may indicate (e.g., to the UE 120) that the PDCCH configuration is associated with, or activated for, SFN based PDCCH communications. If the modified parameter(s) indicate that the first monitoring offset and the second monitoring offset are different and/or that the first frequency domain resource allocation and the second frequency domain resource allocation are different, then the reception of the modified parameter(s) may indicate (e.g., to the UE 120) that the PDCCH configuration is associated with, or activated for, PDCCH repetitions.

As shown by reference number 725, the UE 120 may determine a PDCCH operation associated with the configuration information (e.g., the PDCCH configuration). The UE 120 may determine the PDCCH operation (e.g., SFN based PDCCH communications or PDCCH repetitions) based at least in part on the configuration information and/or signaling received from the base station 110. For example, in some aspects, the base station 110 may explicitly signal the PDCCH operation associated with the PDCCH configuration.

In some aspects, the UE 120 may determine the PDCCH operation based at least in part on a rule (e.g., that is indicated by the base station 110 and/or that is defined, or otherwise fixed, by a wireless communication standard, such as the 3GPP). For example, the rule may indicate that if the two search space sets associated with the PDCCH configuration have the same timing offsets, then the PDCCH configuration is associated with SFN based PDCCH communications. As another example, the rule may indicate that if the two search space sets associated with the PDCCH configuration have different timing offsets, then the PDCCH configuration is associated with PDCCH repetitions. In some aspects, the rule may indicate that if the two CORESETs associated with the PDCCH configuration have the same time domain resource allocation and/or the same frequency domain resource allocation, then the PDCCH configuration is associated with SFN based PDCCH communications. In some aspects, the rule may indicate that if the two CORESETs associated with the PDCCH configuration have different time domain resource allocations and/or different frequency domain resource allocations, then the PDCCH configuration is associated with PDCCH repetitions. In some aspects, the rule may indicate that if two CORESETs are activated for the same search space set, then the PDCCH configuration is associated with SFN based PDCCH communications. The UE 120 may determine the PDCCH operation associated with the PDCCH configuration based at least in part on one or more rules, as described above.

As shown by reference number 730, the base station 110 may transmit, and the UE 120 may receive, one or more PDCCH messages. For example, the base station 110 may transmit, and the UE 120 may receive, one or more SFN PDCCH messages or one or more PDCCH repetitions. For example, if the PDCCH configuration is associated with, or activated for, SFN based PDCCH communications (e.g., based at least in part on two search space sets associated with the PDCCH configuration having the same timing offset, based at least in part on two CORESETs associated with the PDCCH configuration having the same frequency domain resource allocation, and/or based at least in part on two CORESETs being activated for the same search space set), then the base station 110 may transmit, and the UE 120 may receive, one of more SFN based PDCCH messages (e.g., that are transmitted using the same time domain resource and the same frequency domain resources from different TRPs). For example, a first TRP associated with the base station 110 may transmit a first PDCCH message and a second TRP associated with the base station 110 may transmit a second PDCCH message. The first PDCCH message and the second PDCCH message may use the same time domain resources and the same frequency domain resources. The UE 120 may be enabled to receive and/or decode the first PDCCH message and the second PDCCH message based at least in part on the PDCCH configuration, as described above.

In some aspects, if the PDCCH configuration is associated with, or activated for, PDCCH repetitions (e.g., based at least in part on two search space sets associated with the PDCCH configuration having different timing offsets, based at least in part on two CORESETs associated with the PDCCH configuration having different frequency domain resource allocations, and/or based at least in part on only one CORESET being activated for a single search space set), then the base station 110 may transmit, and the UE 120 may receive, one or more repetitions of a PDCCH message. The UE 120 may be enabled to receive and/or decode the one or more repetitions of the PDCCH message based at least in part on the PDCCH configuration, as described above.

As shown by reference number 735, the UE 120 may decode one or more PDCCH messages based at least in part on the PDCCH configuration. For example, the UE 120 may monitor one or more search spaces and/or one or more CORESETs configured by the PDCCH configuration. For example, as described elsewhere herein, the base station 110 may transmit a PDCCH message (e.g., including control information, such as DCI) based at least in part on a search space set. A given search space set defines candidates that may carry a PDCCH within the search space set, where each candidate is associated with one or more CCEs. The base station 110 may flexibly schedule and transmit the PDCCH. In other words, transmission of the PDCCH in a 5G/NR network is not limited to a particular set of frequency resources and/or time resources in a given radio frame, as in the case of, for example, an LTE network. PDCCH frequency domain and time domain resources are configured on a per CORESET basis. Thus, once the UE 120 is configured with one or more CORESETs, the UE 120 has information that identifies which resource blocks in the frequency domain are assigned to a search space set associated with the CORESET(s), as well as information that identifies a number of consecutive symbols occupied by the search space set.

In order to receive a PDCCH associated with one or more candidates of a given UE-specific search space set (i.e., a search space set that may carry control information specific to one or more particular UEs), the UE 120 may attempt to decode a PDCCH in candidates of the search space set. For example, the UE 120 may determine one or more CCE indices associated with a candidate, and may attempt to decode the PDCCH (e.g., using a blind decoding (BD) procedure). In some cases, the UE 120 may be associated with a PDCCH monitoring capability. For example, a limit on a number of BDs performed or a number of CCEs monitored during a period of time may be defined (e.g., by the UE 120, by the base station 110, and/or by a wireless communication standard, such as the 3GPP). For example, the UE 120 may report a PDCCH monitoring capability to the base station 110. The UE 120 may use a maximum CCE/BD limit and a maximum total CCE/BD limit to perform distribution of BDs and CCEs. A maximum CCE/BD limit may identify a maximum number of blind decodes or non-overlapped CCEs per span and per carrier, and a maximum total CCE/BD limit may identify a maximum number of blind decodes or non-overlapped CCEs across spans on active downlink bandwidth part(s) of scheduling cells.

When the UE 120 is monitoring search space sets and/or CORESETs associated with SFN based PDCCH communications, as described above, the UE 120 may count CCEs and/or BDs to ensure that the PDCCH monitoring capability (e.g., a CCE limit or a BD limit) is complied with. However, because different search space sets and/or different CORESETs may occupy the same time domain resources and/or the same frequency domain limits, some CCEs for different CORESETs may overlap (e.g., two different CCEs for two different CORESETs may occupy the same time domain resources and/or the same frequency domain resources). In this case, the UE 120 may refrain from counting two CCEs that overlap as two CCEs. In other words, the UE 120 may not double count CCEs that overlap. For example, if the UE 120 monitors two CCEs that overlap (e.g., that occupy the same time domain resources and/or the same frequency domain resources), the UE 120 may count this as one CCE for CCE counting purposes (e.g., to ensure that the PDCCH monitoring capability (e.g., a CCE limit or a BD limit) is complied with). This may ensure that overlapping CCEs are not double counted, thereby providing additional flexibility for PDCCH scheduling for the UE 120 and the base station 110.

The UE 120 may receive PDCCH messages (e.g., SFN based PDCCH messages and/or PDCCH repetitions) based at least in part on monitoring and/or decoding PDCCH candidates configured by the PDCCH configuration, as described in more detail elsewhere herein. As a result, the base station 110 is enabled to configure a PDCCH for multiple PDCCH operations using the same PDCCH configuration and/or the same PDCCH configuration format. Therefore, a unified and flexible PDCCH configuration is provided. For example, the base station 110 may be enabled to switch PDCCH operations (e.g., between PDCCH repetitions and SFN based PDCCH communications) for the same PDCCH configuration without needing to reconfigure the PDCCH configuration. This provides added scheduling flexibility for the base station 110. Enabling the same PDCCH configuration to be used for multiple PDCCH operations (e.g., PDCCH repetitions and SFN based PDCCH communications) reduces latency associated with switching between the different PDCCH operations, because dynamic or semi-static switching can be used, rather than requiring a PDCCH reconfiguration (e.g., an RRC reconfiguration). Moreover, this reduces a signaling overhead associated with configuring and/or reconfiguring PDCCH configurations. Additionally, the unified PDCCH configuration described herein reduces a total number of PDCCH configurations needed to enable PDCCH repetitions and SFN based PDCCH communications in the wireless network (e.g., reducing signaling overhead and providing additional flexibility to the base station to configure additional or different PDCCH configurations, CORESET configurations, and/or SS set configurations).

As indicated above, FIG. 7 is provided as an example. Other examples may differ from what is described with respect to FIG. 7.

Figure 8:
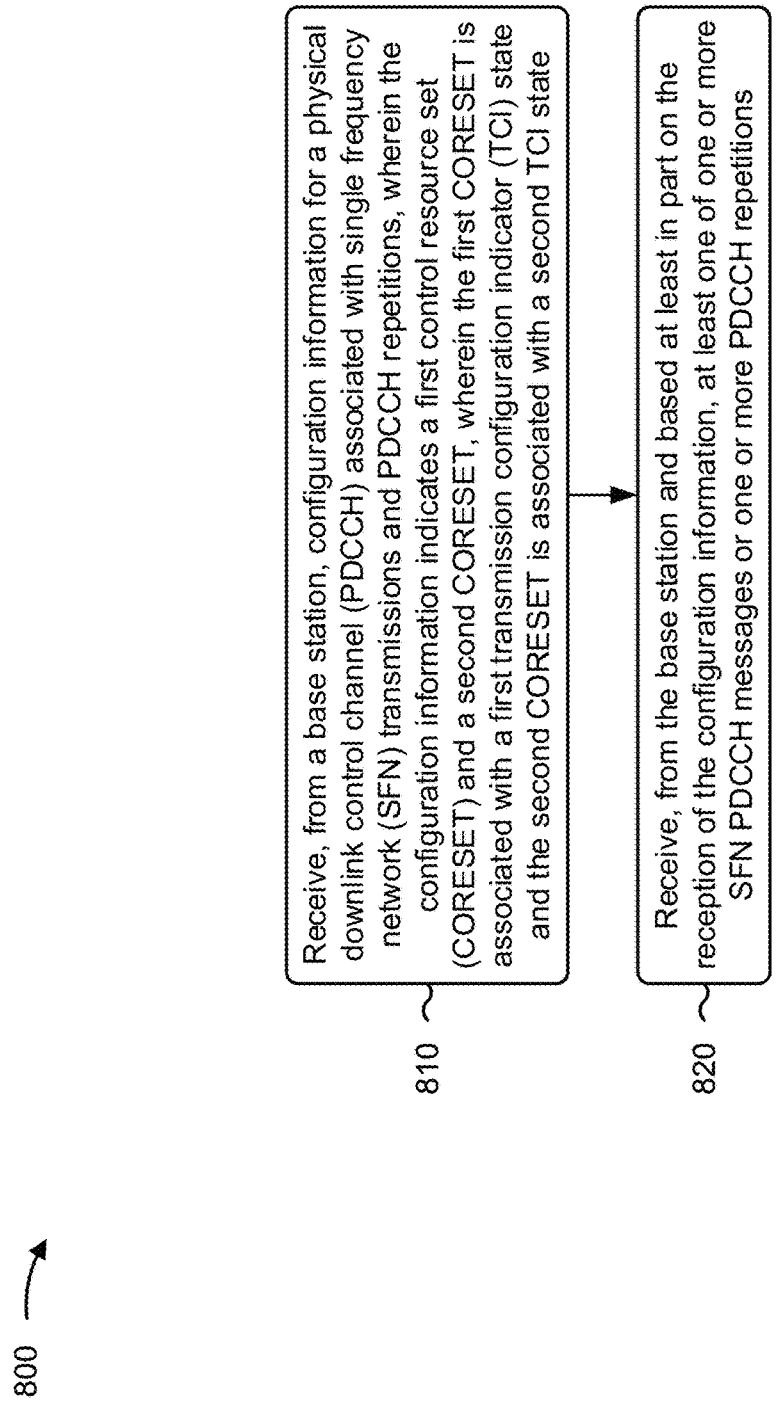
FIGS. 8 and 9 are diagrams illustrating example processes associated with unified PDCCH configurations, in accordance with the present disclosure.

FIG. 8 is a diagram illustrating an example process 800 performed, for example, by a UE, in accordance with the present disclosure. Example process 800 is an example where the UE (e.g., UE 120) performs operations associated with techniques for unified PDCCH configurations.

As shown in FIG. 8, in some aspects, process 800 may include receiving, from a base station, configuration information for a PDCCH associated with SFN transmissions and PDCCH repetitions, wherein the configuration information indicates a first CORESET and a second CORESET, wherein the first CORESET is associated with a first TCI state and the second CORESET is associated with a second TCI state (block 810). For example, the UE (e.g., using communication manager 140 and/or reception component 1002, depicted in FIG. 10) may receive, from a base station, configuration information for a PDCCH associated with SFN transmissions and PDCCH repetitions, wherein the configuration information indicates a first CORESET and a second CORESET, wherein the first CORESET is associated with a first TCI state and the second CORESET is associated with a second TCI state, as described above.

As further shown in FIG. 8, in some aspects, process 800 may include receiving, from the base station and based at least in part on the reception of the configuration information, at least one of one or more SFN PDCCH messages or one or more PDCCH repetitions (block 820). For example, the UE (e.g., using communication manager 140 and/or reception component 1002, depicted in FIG. 10) may receive, from the base station and based at least in part on the reception of the configuration information, at least one of one or more SFN PDCCH messages or one or more PDCCH repetitions, as described above.

Process 800 may include additional aspects, such as any single aspect or any combination of aspects described below and/or in connection with one or more other processes described elsewhere herein.

In a first aspect, receiving the configuration information includes receiving an indication that the first CORESET is associated with a first set of configuration parameters and the second CORESET is associated with a second set of configuration parameters, wherein the first set of configuration parameters and the second set of configuration parameters indicate the same information for one or more parameters, and indicate different information for a first parameter associated with a CORESET index and a second parameter associated with an active TCI state.

In a second aspect, alone or in combination with the first aspect, receiving the configuration information includes receiving an indication of a first search space set associated with the first CORESET and a second search space set associated with the second CORESET, wherein the first search space set and the second search space set have a same configuration for one or more parameters, and wherein the first search space set and the second search space are associated with different search space set index values.

In a third aspect, alone or in combination with one or more of the first and second aspects, receiving the configuration information includes receiving an indication of a search space set that is associated with both the first CORESET and the second CORESET.

In a fourth aspect, alone or in combination with one or more of the first through third aspects, process 800 includes receiving an indication to activate at least one of the first CORESET or the second CORESET.

In a fifth aspect, alone or in combination with one or more of the first through fourth aspects, receiving the indication to activate at least one of the first CORESET or the second CORESET includes receiving the indication via MAC-CE signaling.

In a sixth aspect, alone or in combination with one or more of the first through fifth aspects, the reception of the indication to activate at least one of the first CORESET or the second CORESET indicates that the configuration information is activated for the SFN transmissions.

In a seventh aspect, alone or in combination with one or more of the first through sixth aspects, process 800 includes receiving an indication that the configuration information is activated for the SFN transmissions or for the PDCCH repetitions.

In an eighth aspect, alone or in combination with one or more of the first through seventh aspects, receiving the indication that the configuration information is activated for the SFN transmissions or for the PDCCH repetitions includes receiving the indication that the configuration information is activated for the SFN transmissions or the PDCCH repetitions via at least one of semi-static signaling, Layer 2 signaling, dynamic signaling, MAC signaling, RRC signaling, or DCI signaling.

In a ninth aspect, alone or in combination with one or more of the first through eighth aspects, receiving the configuration information includes receiving an indication of a first search space set associated with the first CORESET and a second search space set associated with the second CORESET, and the configuration information is activated for the SFN transmissions or for the PDCCH repetitions based at least in part on at least one of a first monitoring offset associated with the first search space set, a second monitoring offset associated with the second search space set, a first frequency domain resource allocation associated with the first CORESET, or a second frequency domain resource allocation associated with the second CORESET.

In a tenth aspect, alone or in combination with one or more of the first through ninth aspects, the configuration information is activated for the SFN transmissions based at least in part on the first monitoring offset and the second monitoring offset being a same monitoring offset.

In an eleventh aspect, alone or in combination with one or more of the first through tenth aspects, the configuration information is activated for the PDCCH repetitions based at least in part on the first monitoring offset and the second monitoring offset being different monitoring offsets.

In a twelfth aspect, alone or in combination with one or more of the first through eleventh aspects, process 800 includes receiving an indication of at least one of the first monitoring offset, the second monitoring offset, the first frequency domain resource allocation, or the second frequency domain resource allocation, wherein the indication modifies a value or information associated with at least one of the first monitoring offset, the second monitoring offset, the first frequency domain resource allocation, or the second frequency domain resource allocation, and wherein the reception of the indication indicates that the configuration information is activated for the SFN transmissions.

In a thirteenth aspect, alone or in combination with one or more of the first through twelfth aspects, receiving the configuration information includes receiving an indication that the first CORESET and the second CORESET are associated with same time domain resources and same frequency domain resources, wherein the first CORESET and the second CORESET being associated with the same time domain resources and the same frequency domain resources indicates that the configuration information is activated for SFN transmissions.

In a fourteenth aspect, alone or in combination with one or more of the first through thirteenth aspects, process 800 includes transmitting capability information that indicates whether the UE supports PDCCH configurations associated with both SFN transmissions and PDCCH repetitions.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
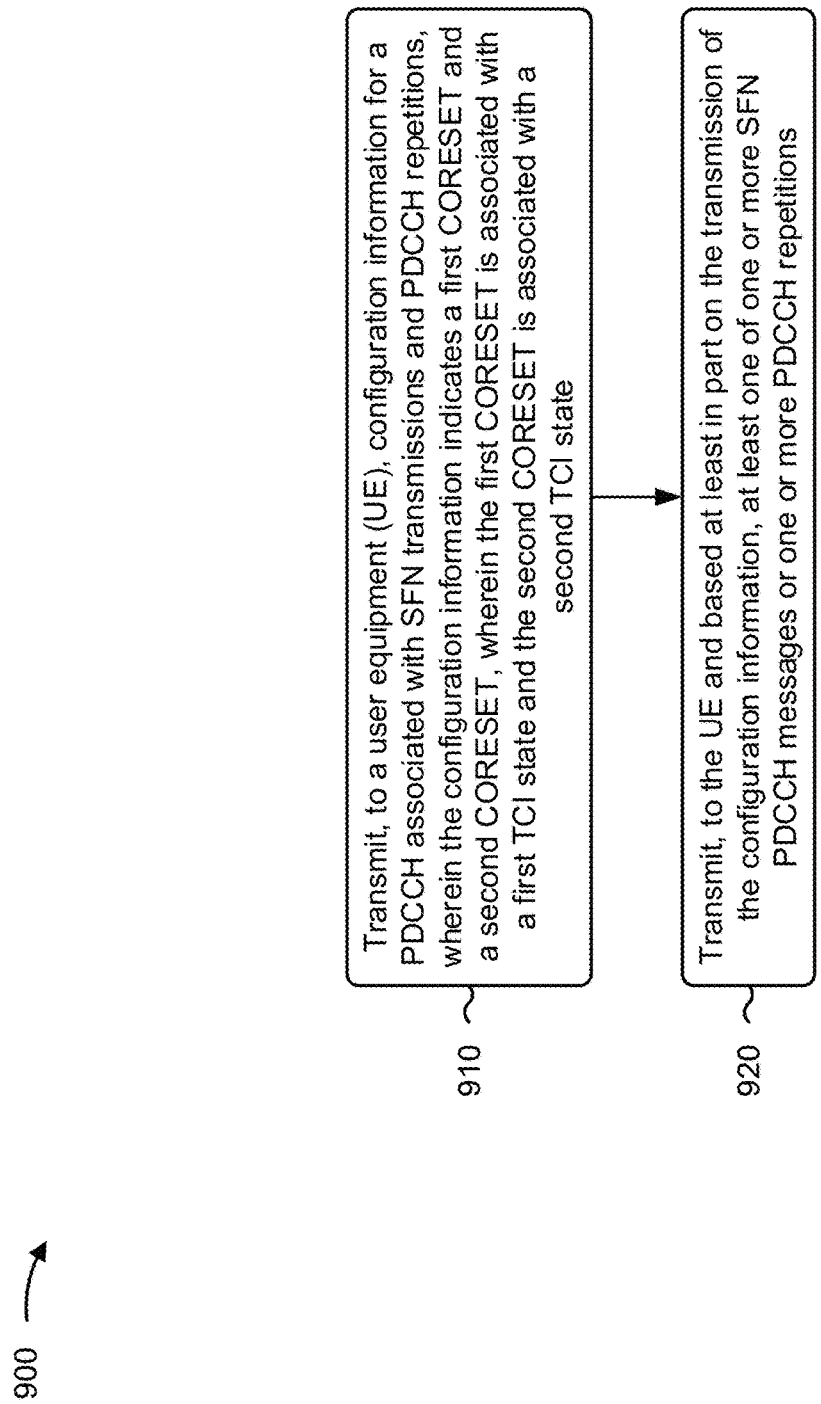

FIG. 9 is a diagram illustrating an example process 900 performed, for example, by a base station, in accordance with the present disclosure. Example process 900 is an example where the base station (e.g., base station 110) performs operations associated with techniques for unified PDCCH configurations.

As shown in FIG. 9, in some aspects, process 900 may include transmitting, to a UE, configuration information for a PDCCH associated with SFN transmissions and PDCCH repetitions, wherein the configuration information indicates a first CORESET and a second CORESET, wherein the first CORESET is associated with a first TCI state and the second CORESET is associated with a second TCI state (block 910). For example, the base station (e.g., using communication manager 150 and/or transmission component 1104, depicted in FIG. 11) may transmit, to a UE, configuration information for a PDCCH associated with SFN transmissions and PDCCH repetitions, wherein the configuration information indicates a first CORESET and a second CORESET, wherein the first CORESET is associated with a first TCI state and the second CORESET is associated with a second TCI state, as described above.

As further shown in FIG. 9, in some aspects, process 900 may include transmitting, to the UE and based at least in part on the transmission of the configuration information, at least one of one or more SFN PDCCH messages or one or more PDCCH repetitions (block 920). For example, the base station (e.g., using communication manager 150 and/or transmission component 1104, depicted in FIG. 11) may transmit, to the UE and based at least in part on the transmission of the configuration information, at least one of one or more SFN PDCCH messages or one or more PDCCH repetitions, as described above.

Process 900 may include additional aspects, such as any single aspect or any combination of aspects described below and/or in connection with one or more other processes described elsewhere herein.

In a first aspect, transmitting the configuration information includes transmitting an indication that the first CORESET is associated with a first set of configuration parameters and the second CORESET is associated with a second set of configuration parameters, wherein the first set of configuration parameters and the second set of configuration parameters indicate the same information for one or more parameters, and indicate different information for a first parameter associated with a CORESET index and a second parameter associated with an active TCI state.

In a second aspect, alone or in combination with the first aspect, transmitting the configuration information includes transmitting an indication of a first search space set associated with the first CORESET and a second search space set associated with the second CORESET, wherein the first search space set and the second search space set have a same configuration for one or more parameters, and wherein the first search space set and the second search space are associated with different search space set index values.

In a third aspect, alone or in combination with one or more of the first and second aspects, transmitting the configuration information includes transmitting an indication of a search space set that is associated with both the first CORESET and the second CORESET.

In a fourth aspect, alone or in combination with one or more of the first through third aspects, process 900 includes transmitting an indication to activate at least one of the first CORESET or the second CORESET.

In a fifth aspect, alone or in combination with one or more of the first through fourth aspects, transmitting the indication to activate at least one of the first CORESET or the second CORESET includes transmitting the indication via MAC-CE signaling.

In a sixth aspect, alone or in combination with one or more of the first through fifth aspects, the transmission of the indication to activate at least one of the first CORESET or the second CORESET indicates that the configuration information is activated for the SFN transmissions.

In a seventh aspect, alone or in combination with one or more of the first through sixth aspects, process 900 includes transmitting an indication that the configuration information is activated for the SFN transmissions or for the PDCCH repetitions.

In an eighth aspect, alone or in combination with one or more of the first through seventh aspects, transmitting the indication that the configuration information is activated for the SFN transmissions or for the PDCCH repetitions includes transmitting the indication that the configuration information is activated for the SFN transmissions or the PDCCH repetitions via at least one of semi-static signaling, Layer 2 signaling, dynamic signaling, MAC signaling, RRC signaling, or DCI signaling.

In a ninth aspect, alone or in combination with one or more of the first through eighth aspects, transmitting the configuration information includes transmitting an indication of a first search space set associated with the first CORESET and a second search space set associated with the second CORESET, and the configuration information is activated for the SFN transmissions or for the PDCCH repetitions based at least in part on at least one of a first monitoring offset associated with the first search space set, a second monitoring offset associated with the second search space set, a first frequency domain resource allocation associated with the first CORESET, or a second frequency domain resource allocation associated with the second CORESET.

In a tenth aspect, alone or in combination with one or more of the first through ninth aspects, the configuration information is activated for the SFN transmissions based at least in part on the first monitoring offset and the second monitoring offset being a same monitoring offset.

In an eleventh aspect, alone or in combination with one or more of the first through tenth aspects, the configuration information is activated for the PDCCH repetitions based at least in part on the first monitoring offset and the second monitoring offset being different monitoring offsets.

In a twelfth aspect, alone or in combination with one or more of the first through eleventh aspects, process 900 includes transmitting an indication of at least one of the first monitoring offset, the second monitoring offset, the first frequency domain resource allocation, or the second frequency domain resource allocation, wherein the indication modifies a value or information associated with at least one of the first monitoring offset, the second monitoring offset, the first frequency domain resource allocation, or the second frequency domain resource allocation, and wherein the transmission of the indication indicates that the configuration information is activated for the SFN transmissions.

In a thirteenth aspect, alone or in combination with one or more of the first through twelfth aspects, transmitting the configuration information includes transmitting an indication that the first CORESET and the second CORESET are associated with same time domain resources and same frequency domain resources, wherein the first CORESET and the second CORESET being associated with the same time domain resources and the same frequency domain resources indicates that the configuration information is activated for SFN transmissions.

In a fourteenth aspect, alone or in combination with one or more of the first through thirteenth aspects, process 900 includes receiving, from the UE, capability information that indicates whether the UE supports PDCCH configurations associated with both SFN transmissions and PDCCH repetitions.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
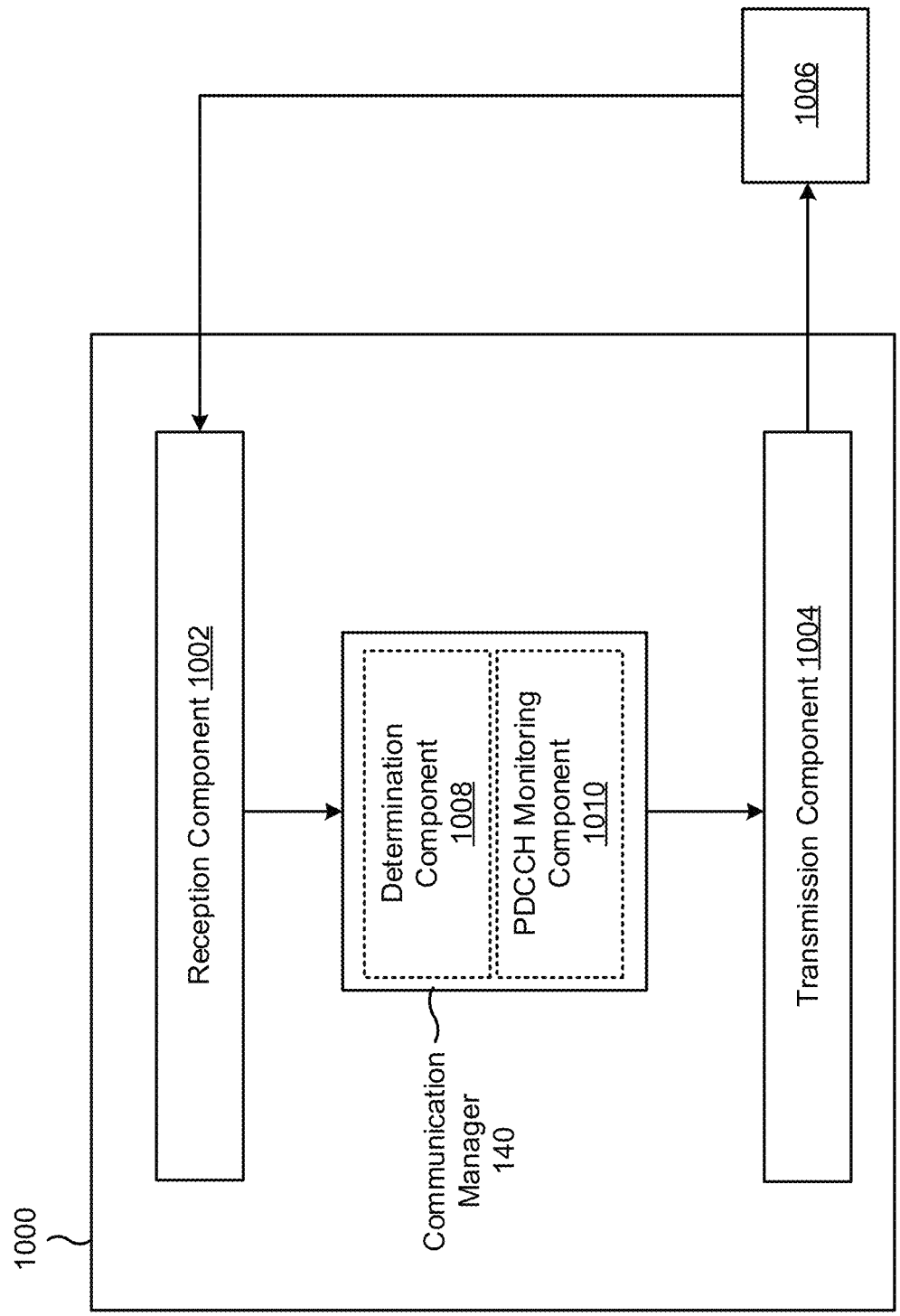
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a determination component 1008, and/or a PDCCH monitoring component 1010, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a base station, configuration information for a PDCCH associated with SFN transmissions and PDCCH repetitions, wherein the configuration information indicates a first CORESET and a second CORESET, wherein the first CORESET is associated with a first TCI state and the second CORESET is associated with a second TCI state. The reception component 1002 may receive, from the base station and based at least in part on the reception of the configuration information, at least one of one or more SFN PDCCH messages or one or more PDCCH repetitions.

The reception component 1002 may receive an indication to activate at least one of the first CORESET or the second CORESET.

The reception component 1002 may receive an indication that the configuration information is activated for the SFN transmissions or for the PDCCH repetitions.

The reception component 1002 may receive an indication of at least one of the first monitoring offset, the second monitoring offset, the first frequency domain resource allocation, or the second frequency domain resource allocation, wherein the indication modifies a value or information associated with at least one of the first monitoring offset, the second monitoring offset, the first frequency domain resource allocation, or the second frequency domain resource allocation, and wherein the reception of the indication indicates that the configuration information is activated for the SFN transmissions.

The determination component 1008 may determine whether the PDCCH configuration is activated for the SFN transmissions or for the PDCCH repetitions based at least in part on at least one of the configuration information or a message received from the base station.

The PDCCH monitoring component 1010 may monitor the PDCCH for SFN transmissions or for PDCCH repetitions in accordance with the configuration information.

The transmission component 1004 may transmit capability information that indicates whether the apparatus 1000 supports PDCCH configurations associated with both SFN transmissions and PDCCH repetitions.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
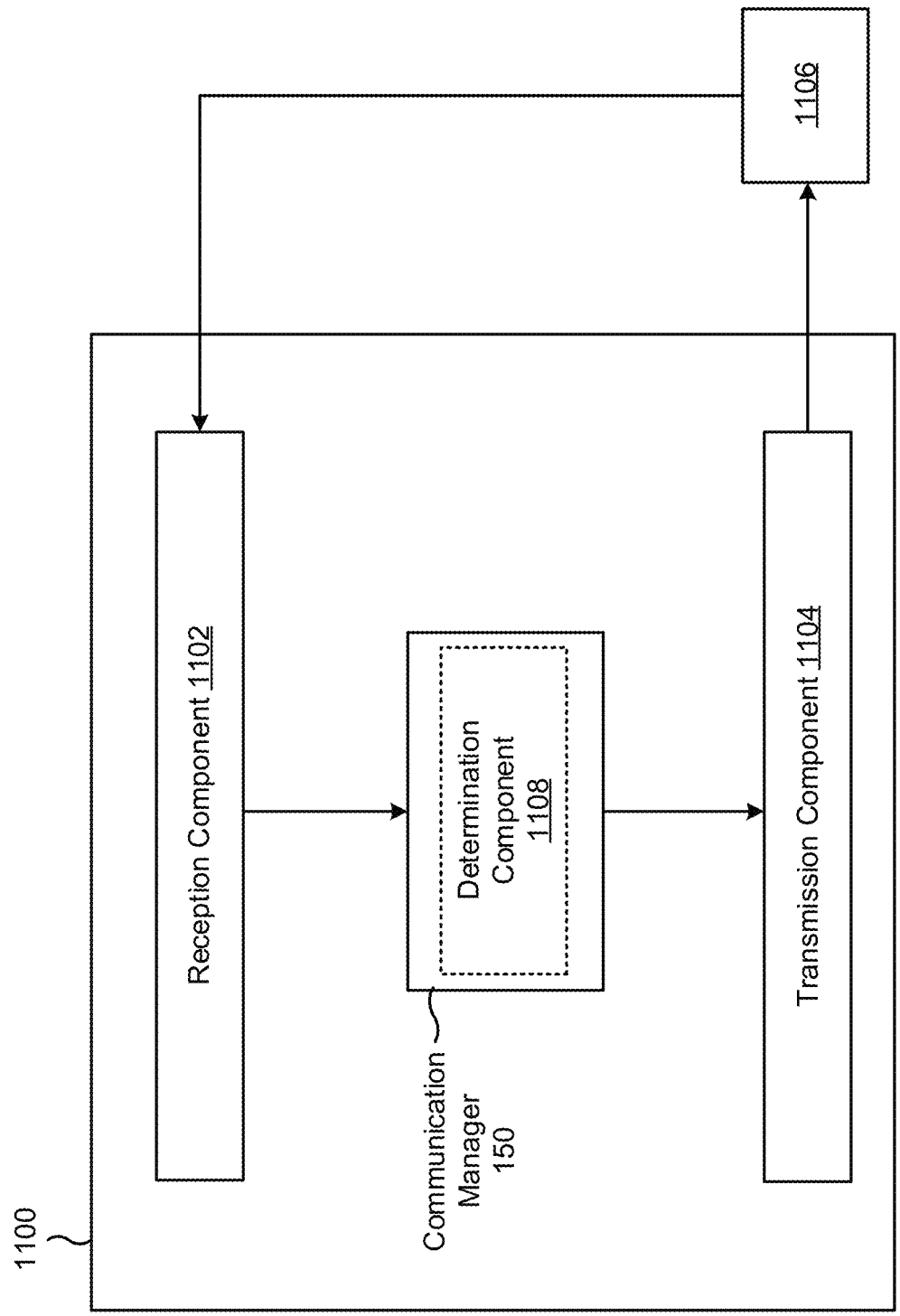

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a determination component 1108, among other examples.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit, to the apparatus 1106, configuration information for a PDCCH associated with SFN transmissions and PDCCH repetitions, wherein the configuration information indicates a first CORESET and a second CORESET, wherein the first CORESET is associated with a first TCI state and the second CORESET is associated with a second TCI state. The transmission component 1104 may transmit, to the apparatus 1106 and based at least in part on the transmission of the configuration information, at least one of one or more SFN PDCCH messages or one or more PDCCH repetitions.

The transmission component 1104 may transmit an indication to activate at least one of the first CORESET or the second CORESET.

The transmission component 1104 may transmit an indication that the configuration information is activated for the SFN transmissions or for the PDCCH repetitions.

The transmission component 1104 may transmit an indication of at least one of the first monitoring offset, the second monitoring offset, the first frequency domain resource allocation, or the second frequency domain resource allocation, wherein the indication modifies a value or information associated with at least one of the first monitoring offset, the second monitoring offset, the first frequency domain resource allocation, or the second frequency domain resource allocation, and wherein the transmission of the indication indicates that the configuration information is activated for the SFN transmissions.

The determination component 1108 may determine whether the PDCCH is to be activated for the SFN transmissions or for the PDCCH repetitions. The determination component 1108 may determine the configuration information based at least in part on whether the PDCCH is to be activated for the SFN transmissions or for the PDCCH repetitions.

The reception component 1102 may receive capability information that indicates whether the UE supports PDCCH configurations associated with both SFN transmissions and PDCCH repetitions.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a base station, configuration information for a physical downlink control channel (PDCCH) associated with single frequency network (SFN) transmissions and PDCCH repetitions, wherein the configuration information indicates a first control resource set (CORESET) and a second CORESET, wherein the first CORESET is associated with a first transmission configuration indicator (TCI) state and the second CORESET is associated with a second TCI state; and receiving, from the base station and based at least in part on the reception of the configuration information, at least one of one or more SFN PDCCH messages or one or more PDCCH repetitions.

Aspect 2: The method of Aspect 1, wherein receiving the configuration information comprises: receiving an indication that the first CORESET is associated with a first set of configuration parameters and the second CORESET is associated with a second set of configuration parameters, wherein the first set of configuration parameters and the second set of configuration parameters indicate same information for one or more parameters, and indicate different information for a first parameter associated with a CORESET index and a second parameter associated with an active TCI state.

Aspect 3: The method of any of Aspects 1-2, wherein receiving the configuration information comprises: receiving an indication of a first search space set associated with the first CORESET and a second search space set associated with the second CORESET, wherein the first search space set and the second search space set have a same configuration for one or more parameters, and wherein the first search space set and the second search space are associated with different search space set index values.

Aspect 4: The method of any of Aspects 1-3, wherein receiving the configuration information comprises: receiving an indication of a search space set that is associated with both the first CORESET and the second CORESET.

Aspect 5: The method of Aspect 4, further comprising: receiving an indication to activate at least one of the first CORESET or the second CORESET.

Aspect 6: The method of Aspect 5, wherein receiving the indication to activate at least one of the first CORESET or the second CORESET comprises: receiving the indication via medium access control (MAC) control element (MAC-CE) signaling.

Aspect 7: The method of any of Aspects 5-6, wherein the reception of the indication to activate at least one of the first CORESET or the second CORESET indicates that the configuration information is activated for the SFN transmissions.

Aspect 8: The method of any of Aspects 1-7, further comprising: receiving an indication that the configuration information is activated for the SFN transmissions or for the PDCCH repetitions.

Aspect 9: The method of Aspect 8, wherein receiving the indication that the configuration information is activated for the SFN transmissions or for the PDCCH repetitions comprises: receiving the indication that the configuration information is activated for the SFN transmissions or the PDCCH repetitions via at least one of semi-static signaling, Layer 2 signaling, dynamic signaling, medium access control (MAC) signaling, radio resource control (RRC) signaling, or downlink control information (DCI) signaling.

Aspect 10: The method of any of Aspects 1-9, wherein receiving the configuration information comprises: receiving an indication of a first search space set associated with the first CORESET and a second search space set associated with the second CORESET, and wherein the configuration information is activated for the SFN transmissions or for the PDCCH repetitions based at least in part on at least one of a first monitoring offset associated with the first search space set, a second monitoring offset associated with the second search space set, a first frequency domain resource allocation associated with the first CORESET, or a second frequency domain resource allocation associated with the second CORESET.

Aspect 11: The method of Aspect 10, wherein the configuration information is activated for the SFN transmissions based at least in part on the first monitoring offset and the second monitoring offset being a same monitoring offset.

Aspect 12: The method of any of Aspects 10-11, wherein the configuration information is activated for the PDCCH repetitions based at least in part on the first monitoring offset and the second monitoring offset being different monitoring offsets.

Aspect 13: The method of any of Aspects 10-12, further comprising: receiving an indication of at least one of the first monitoring offset, the second monitoring offset, the first frequency domain resource allocation, or the second frequency domain resource allocation, wherein the indication modifies a value or information associated with at least one of the first monitoring offset, the second monitoring offset, the first frequency domain resource allocation, or the second frequency domain resource allocation, and wherein the reception of the indication indicates that the configuration information is activated for the SFN transmissions.

Aspect 14: The method of any of Aspects 1-13, wherein receiving the configuration information comprises: receiving an indication that the first CORESET and the second CORESET are associated with same time domain resources and same frequency domain resources, wherein the first CORESET and the second CORESET being associated with the same time domain resources and the same frequency domain resources indicates that the configuration information is activated for SFN transmissions.

Aspect 15: The method of any of Aspects 1-14, further comprising: transmitting capability information that indicates whether the UE supports PDCCH configurations associated with both SFN transmissions and PDCCH repetitions.

Aspect 16: A method of wireless communication performed by a base station, comprising: transmitting, to a user equipment (UE), configuration information for a physical downlink control channel (PDCCH) associated with single frequency network (SFN) transmissions and PDCCH repetitions, wherein the configuration information indicates a first control resource set (CORESET) and a second CORESET, wherein the first CORESET is associated with a first transmission configuration indicator (TCI) state and the second CORESET is associated with a second TCI state; and transmitting, to the UE and based at least in part on the transmission of the configuration information, at least one of one or more SFN PDCCH messages or one or more PDCCH repetitions.

Aspect 17: The method of Aspect 16, wherein transmitting the configuration information comprises: transmitting an indication that the first CORESET is associated with a first set of configuration parameters and the second CORESET is associated with a second set of configuration parameters, wherein the first set of configuration parameters and the second set of configuration parameters indicate same information for one or more parameters, and indicate different information for a first parameter associated with a CORESET index and a second parameter associated with an active TCI state.

Aspect 18: The method of any of Aspects 16-17, wherein transmitting the configuration information comprises: transmitting an indication of a first search space set associated with the first CORESET and a second search space set associated with the second CORESET, wherein the first search space set and the second search space set have a same configuration for one or more parameters, and wherein the first search space set and the second search space set are associated with different search space set index values.

Aspect 19: The method of any of Aspects 16-18, wherein transmitting the configuration information comprises: transmitting an indication of a search space set that is associated with both the first CORESET and the second CORESET.

Aspect 20: The method of Aspect 19, further comprising: transmitting an indication to activate at least one of the first CORESET or the second CORESET.

Aspect 21: The method of Aspect 20, wherein transmitting the indication to activate at least one of the first CORESET or the second CORESET comprises: transmitting the indication via medium access control (MAC) control element (MAC-CE) signaling.

Aspect 22: The method of any of Aspects 20-21, wherein the transmission of the indication to activate at least one of the first CORESET or the second CORESET indicates that the configuration information is activated for the SFN transmissions.

Aspect 23: The method of any of Aspects 16-22, further comprising: transmitting an indication that the configuration information is activated for the SFN transmissions or for the PDCCH repetitions.

Aspect 24: The method of Aspect 23, wherein transmitting the indication that the configuration information is activated for the SFN transmissions or for the PDCCH repetitions comprises: transmitting the indication that the configuration information is activated for the SFN transmissions or the PDCCH repetitions via at least one of semi-static signaling, Layer 2 signaling, dynamic signaling, medium access control (MAC) signaling, radio resource control (RRC) signaling, or downlink control information (DCI) signaling.

Aspect 25: The method of any of Aspects 16-24, wherein transmitting the configuration information comprises: transmitting an indication of a first search space set associated with the first CORESET and a second search space set associated with the second CORESET, and wherein the configuration information is activated for the SFN transmissions or for the PDCCH repetitions based at least in part on at least one of a first monitoring offset associated with the first search space set, a second monitoring offset associated with the second search space set, a first frequency domain resource allocation associated with the first CORESET, or a second frequency domain resource allocation associated with the second CORESET.

Aspect 26: The method of Aspect 25, wherein the configuration information is activated for the SFN transmissions based at least in part on the first monitoring offset and the second monitoring offset being a same monitoring offset.

Aspect 27: The method of any of Aspects 25-26, wherein the configuration information is activated for the PDCCH repetitions based at least in part on the first monitoring offset and the second monitoring offset being different monitoring offsets.

Aspect 27: The method of any of Aspects 25-27, further comprising: transmitting an indication of at least one of the first monitoring offset, the second monitoring offset, the first frequency domain resource allocation, or the second frequency domain resource allocation, wherein the indication modifies a value or information associated with at least one of the first monitoring offset, the second monitoring offset, the first frequency domain resource allocation, or the second frequency domain resource allocation, and wherein the transmission of the indication indicates that the configuration information is activated for the SFN transmissions.

Aspect 29: The method of any of Aspects 16-28, wherein transmitting the configuration information comprises: transmitting an indication that the first CORESET and the second CORESET are associated with same time domain resources and same frequency domain resources, wherein the first CORESET and the second CORESET being associated with the same time domain resources and the same frequency domain resources indicates that the configuration information is activated for SFN transmissions.

Aspect 30: The method of any of Aspects 16-29, further comprising: receiving, from the UE, capability information that indicates whether the UE supports PDCCH configurations associated with both SFN transmissions and PDCCH repetitions.

Aspect 31: An apparatus for wireless communication at a device, comprising a processor; memory coupled with the processor; and instructions stored in the memory and executable by the processor to cause the apparatus to perform the method of one or more of Aspects 1-15.

Aspect 32: A device for wireless communication, comprising a memory and one or more processors coupled to the memory, the one or more processors configured to perform the method of one or more of Aspects 1-15.

Aspect 33: An apparatus for wireless communication, comprising at least one means for performing the method of one or more of Aspects 1-15.

Aspect 34: A non-transitory computer-readable medium storing code for wireless communication, the code comprising instructions executable by a processor to perform the method of one or more of Aspects 1-15.

Aspect 35: A non-transitory computer-readable medium storing a set of instructions for wireless communication, the set of instructions comprising one or more instructions that, when executed by one or more processors of a device, cause the device to perform the method of one or more of Aspects 1-15.

Aspect 36: An apparatus for wireless communication at a device, comprising a processor; memory coupled with the processor; and instructions stored in the memory and executable by the processor to cause the apparatus to perform the method of one or more of Aspects 16-30.

Aspect 37: A device for wireless communication, comprising a memory and one or more processors coupled to the memory, the one or more processors configured to perform the method of one or more of Aspects 16-30.

Aspect 38: An apparatus for wireless communication, comprising at least one means for performing the method of one or more of Aspects 16-30.

Aspect 39: A non-transitory computer-readable medium storing code for wireless communication, the code comprising instructions executable by a processor to perform the method of one or more of Aspects 16-30.

Aspect 40: A non-transitory computer-readable medium storing a set of instructions for wireless communication, the set of instructions comprising one or more instructions that, when executed by one or more processors of a device, cause the device to perform the method of one or more of Aspects 16-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a network entity, configuration information for a physical downlink control channel (PDCCH) associated with single frequency network (SFN) transmissions and PDCCH repetitions, wherein the configuration information indicates a first control resource set (CORESET) and a second CORESET, wherein the first CORESET is associated with a first transmission configuration indicator (TCI) state and the second CORESET is associated with a second TCI state, and wherein receiving the configuration information comprises receiving an indication of a search space set that is associated with both the first CORESET and the second CORESET; and
   receiving, from the network entity and based at least in part on whether both the first CORESET and the second CORESET that are associated with the search space set are activated, at least one of one or more SFN PDCCH messages or one or more PDCCH repetitions.

2. The method of claim 1, wherein receiving the configuration information further comprises:
   receiving an indication that the first CORESET is associated with a first set of configuration parameters and the second CORESET is associated with a second set of configuration parameters, wherein the first set of configuration parameters and the second set of configuration parameters indicate same information for one or more parameters, and indicate different information for a first parameter associated with a CORESET index and a second parameter associated with an active TCI state.

3. The method of claim 1, further comprising:
   receiving an indication to activate at least one of the first CORESET or the second CORESET.

4. The method of claim 3, wherein the indication is an indication to activate both the first CORESET and the second CORESET and indicates that the configuration information is activated for the SFN transmissions.

5. The method of claim 3, wherein the indication is an indication to activate one of the first CORESET or the second CORESET and indicates that the configuration information is activated for the PDCCH repetitions.

6. The method of claim 1, further comprising:
receiving an indication that the configuration information is activated for the SFN transmissions or for the PDCCH repetitions.

7. The method of claim 1, wherein the configuration information is activated for the SFN transmissions or for the PDCCH repetitions based at least in part on at least one of a first frequency domain resource allocation associated with the first CORESET or a second frequency domain resource allocation associated with the second CORESET.

8. The method of claim 1, wherein receiving the configuration information further comprises:
receiving an indication that the first CORESET and the second CORESET are associated with same time domain resources and same frequency domain resources, wherein the first CORESET and the second CORESET being associated with the same time domain resources and the same frequency domain resources indicates that the configuration information is activated for SFN transmissions.

9. The method of claim 1, wherein the receiving the at least one of the one or more SFN PDCCH messages or the one or more PDCCH repetitions comprises:
receiving the one or more SFN PDCCH messages based at least in part on both the first CORESET and the second CORESET, that are associated with the search space set, being activated; or
receiving the one or more PDCCH repetitions based at least in part on one of the first CORESET or the second CORESET, that are associated with the search space set, being activated.

10. A method of wireless communication performed by a network entity, comprising:
transmitting, to a user equipment (UE), configuration information for a physical downlink control channel (PDCCH) associated with single frequency network (SFN) transmissions and PDCCH repetitions, wherein the configuration information indicates a first control resource set (CORESET) and a second CORESET, wherein the first CORESET is associated with a first transmission configuration indicator (TCI) state and the second CORESET is associated with a second TCI state, and wherein transmitting the configuration information comprises transmitting an indication of a search space set that is associated with both the first CORESET and the second CORESET; and
transmitting, to the UE and based at least in part on whether both the first CORESET and the second CORESET that are associated with the search space set are activated, at least one of one or more SFN PDCCH messages or one or more PDCCH repetitions.

11. The method of claim 10, wherein transmitting the configuration information further comprises:
transmitting an indication that the first CORESET is associated with a first set of configuration parameters and the second CORESET is associated with a second set of configuration parameters, wherein the first set of configuration parameters and the second set of configuration parameters indicate same information for one or more parameters, and indicate different information for a first parameter associated with a CORESET index and a second parameter associated with an active TCI state.

12. The method of claim 10, further comprising:
transmitting an indication that the configuration information is activated for the SFN transmissions or for the PDCCH repetitions.

13. The method of claim 10, wherein the configuration information is activated for the SFN transmissions or for the PDCCH repetitions based at least in part on at least one of a first frequency domain resource allocation associated with the first CORESET or a second frequency domain resource allocation associated with the second CORESET.

14. The method of claim 10, further comprising:
transmitting an indication to activate at least one of the first CORESET or the second CORESET.

15. The method of claim 14, wherein the transmission of the indication to activate at least one of the first CORESET or the second CORESET indicates that the configuration information is activated for the SFN transmissions.

16. The method of claim 10, wherein transmitting the configuration information further comprises:
transmitting an indication that the first CORESET and the second CORESET are associated with same time domain resources and same frequency domain resources, wherein the first CORESET and the second CORESET being associated with the same time domain resources and the same frequency domain resources indicates that the configuration information is activated for SFN transmissions.

17. A user equipment (UE) for wireless communication, comprising:
one or more memories; and
one or more processors, coupled to the one or more memories, configured to:
receive, from a network entity, configuration information for a physical downlink control channel (PDCCH) associated with single frequency network (SFN) transmissions and PDCCH repetitions, wherein the configuration information indicates a first control resource set (CORESET) and a second CORESET, wherein the first CORESET is associated with a first transmission configuration indicator (TCI) state and the second CORESET is associated with a second TCI state, and wherein to receive the configuration information, the one or more processors are configured to receive an indication of a search space set that is associated with both the first CORESET and the second CORESET; and
receive, from the network entity and based at least in part on whether both the first CORESET and the second CORESET that are associated with the search space set are activated, at least one of one or more SFN PDCCH messages or one or more PDCCH repetitions.

18. The UE of claim 17, wherein the one or more processors, to receive the configuration information, are further configured to:
receive an indication that the first CORESET is associated with a first set of configuration parameters and the second CORESET is associated with a second set of configuration parameters, wherein the first set of configuration parameters and the second set of configuration parameters indicate same information for one or more parameters, and indicate different information for a first parameter associated with a CORESET index and a second parameter associated with an active TCI state.

19. The UE of claim 17, wherein the one or more processors are further configured to:
receive an indication to activate at least one of the first CORESET or the second CORESET.

20. The UE of claim 19, wherein the reception of the indication to activate at least one of the first CORESET or the second CORESET indicates that the configuration information is activated for the SFN transmissions.

21. The UE of claim 17, wherein the one or more processors are further configured to:
receive an indication that the configuration information is activated for the SFN transmissions or for the PDCCH repetitions.

22. The UE of claim 17, wherein the configuration information is activated for the SFN transmissions or for the PDCCH repetitions based at least in part on at least one of a first frequency domain resource allocation associated with the first CORESET or a second frequency domain resource allocation associated with the second CORESET.

23. The UE of claim 17, wherein the one or more processors, to receive the configuration information, are further configured to:
receive an indication that the first CORESET and the second CORESET are associated with same time domain resources and same frequency domain resources, wherein the first CORESET and the second CORESET being associated with the same time domain resources and the same frequency domain resources indicates that the configuration information is activated for SFN transmissions.

24. A network entity for wireless communication, comprising:
one or more memories; and
one or more processors, coupled to the one or more memories, configured to:
transmit, to a user equipment (UE), configuration information for a physical downlink control channel (PDCCH) associated with single frequency network (SFN) transmissions and PDCCH repetitions, wherein the configuration information indicates a first control resource set (CORESET) and a second CORESET, wherein the first CORESET is associated with a first transmission configuration indicator (TCI) state and the second CORESET is associated with a second TCI state, and wherein to transmit the configuration information, the one or more processors are configured to transmit an indication of a search space set that is associated with both the first CORESET and the second CORESET; and
transmit, to the UE and based at least in part on whether both the first CORESET and the second CORESET that are associated with the search space set are activated, at least one of one or more SFN PDCCH messages or one or more PDCCH repetitions.

25. The network entity of claim 24, wherein the one or more processors, to transmit the configuration information, are configured to:
transmit an indication that the first CORESET is associated with a first set of configuration parameters and the second CORESET is associated with a second set of configuration parameters, wherein the first set of configuration parameters and the second set of configuration parameters indicate same information for one or more parameters, and indicate different information for a first parameter associated with a CORESET index and a second parameter associated with an active TCI state.

26. The network entity of claim 24, wherein the one or more processors are further configured to:
transmit an indication that the configuration information is activated for the SFN transmissions or for the PDCCH repetitions.

27. The network entity of claim 24, wherein the configuration information is activated for the SFN transmissions or for the PDCCH repetitions based at least in part on at least one of a first frequency domain resource allocation associated with the first CORESET or a second frequency domain resource allocation associated with the second CORESET.

28. The network entity of claim 24, wherein the one or more processors are further configured to:
transmit an indication to activate at least one of the first CORESET or the second CORESET.

\* \* \* \* \*